United States Patent
Griot et al.

(10) Patent No.: US 9,826,404 B2
(45) Date of Patent: Nov. 21, 2017

(54) SYSTEM AND METHOD FOR PEER-TO-PEER AUTHORIZATION VIA NON-ACCESS STRATUM PROCEDURES

(75) Inventors: Miguel Griot, San Diego, CA (US); Gavin Bernard Horn, La Jolla, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1166 days.

(21) Appl. No.: 13/347,547

(22) Filed: Jan. 10, 2012

(65) Prior Publication Data

US 2012/0179789 A1    Jul. 12, 2012

Related U.S. Application Data

(60) Provisional application No. 61/431,765, filed on Jan. 11, 2011.

(51) Int. Cl.
*G06F 15/177* (2006.01)
*H04W 12/08* (2009.01)
(Continued)

(52) U.S. Cl.
CPC ........... *H04W 12/08* (2013.01); *H04W 48/16* (2013.01); *H04L 41/12* (2013.01); *H04L 67/104* (2013.01);
(Continued)

(58) Field of Classification Search
CPC ... H04W 76/02; H04W 8/005; H04W 76/046; H04W 12/06; H04W 48/16;
(Continued)

(56) References Cited

U.S. PATENT DOCUMENTS 8,493,887 B2    7/2013    Palanki et al.
2007/0171910 A1    7/2007    Kumar et al.
(Continued)

FOREIGN PATENT DOCUMENTS

CN    1703023 A    11/2005
CN    1735222 A    2/2006
(Continued)

OTHER PUBLICATIONS

3GPP, "3rd Generation Partnership Project; Technical Specification Group Core Network and Terminals; Non-Access Stratum (NAS) protocol for Evolved Packet System (EPS); Stage 3 (Release 10)", Dec. 2010, p. 1-305, 3GPP.*
(Continued)

*Primary Examiner* — Taylor Elfervig
(74) *Attorney, Agent, or Firm* — Harrity & Harrity, LLP

(57) ABSTRACT

Peer-to-peer (P2P) authorization by a mobile entity of a wireless communications system may include receiving a P2P authorization accept message from a management entity via a non-access stratum (NAS), receiving a radio resource control (RRC) P2P configuration request from a network entity, and sending an RRC P2P configuration complete message to the network entity via an access stratum. A management entity receiving a P2P authorization request message from a mobile entity may perform a P2P authorization check based on the received P2P authorization request message, and if the mobile entity is authorized, send a P2P authorization accept message to the mobile entity via the NAS. Alternatively, P2P authorization by a mobile entity may include sending a registration message including a P2P authorization request to a core network, and receiving a registration accept message from the core network that includes an initial context setup request and a P2P authorization response.

66 Claims, 19 Drawing Sheets

(51) Int. Cl.
H04W 48/16 (2009.01)
H04W 8/00 (2009.01)
H04L 29/08 (2006.01)
H04L 12/24 (2006.01)
H04W 76/02 (2009.01)
H04W 84/04 (2009.01)

(52) U.S. Cl.
CPC ......... *H04L 67/1061* (2013.01); *H04W 8/005* (2013.01); *H04W 76/023* (2013.01); *H04W 84/045* (2013.01)

(58) Field of Classification Search
CPC ............... H04L 67/104; H04L 65/1069; H04L 12/2602; H04L 63/0263; H04L 41/12; H04L 67/1061; H04N 21/6131
USPC ........................................................ 709/220
See application file for complete search history.

(56) References Cited

U.S. PATENT DOCUMENTS

| | | | |
|---|---|---|---|
| 2008/0076419 A1* | 3/2008 | Khetawat | H04L 12/2602 455/435.1 |
| 2008/0310378 A1 | 12/2008 | Kitazoe et al. | |
| 2009/0193506 A1* | 7/2009 | McGrew | H04L 63/0263 726/6 |
| 2010/0054472 A1 | 3/2010 | Barany et al. | |
| 2010/0069067 A1 | 3/2010 | Vanderveen et al. | |
| 2010/0093364 A1 | 4/2010 | Ribeiro et al. | |
| 2010/0112980 A1 | 5/2010 | Horn et al. | |
| 2010/0203865 A1 | 8/2010 | Horn et al. | |
| 2010/0208698 A1 | 8/2010 | Lu et al. | |
| 2010/0260096 A1 | 10/2010 | Ulupinar et al. | |
| 2011/0075675 A1 | 3/2011 | Koodli et al. | |
| 2012/0163235 A1* | 6/2012 | Ho et al. | 370/254 |

FOREIGN PATENT DOCUMENTS

| | | | | |
|---|---|---|---|---|
| CN | 1735224 A | 2/2006 | | |
| CN | 1735256 A | 2/2006 | | |
| CN | 102196453 A | 9/2011 | | |
| EP | WO 2010/028690 A1 * | 3/2010 | ............ | H04L 29/12 |
| JP | 2008510342 A | 4/2008 | | |
| WO | 2006003739 A1 | 1/2006 | | |
| WO | 2006016329 A1 | 2/2006 | | |
| WO | 2010028690 A1 | 3/2010 | | |
| WO | 2010082690 A1 | 7/2010 | | |
| WO | WO-2010078271 A2 | 7/2010 | | |

OTHER PUBLICATIONS

Milic, D.; Braun, T., "Fisheye: Topology aware choice of peers for overlay networks," in Local Computer Networks, 2009. LCN 2009. IEEE 34th Conference on , vol. , No. , pp. 467-474, Oct. 20-23, 2009.*

E. Carlini, M. Coppola, P. Dazzi, D. Laforenza, S. Martinelli and L. Ricci, "Service and Resource Discovery supports over P2P overlays," 2009 International Conference on Ultra Modern Telecommunications & Workshops, St. Petersburg, 2009, pp. 1-8.*

Q. Qiu, Z. Tang and Y. Yu, "A decentralized authorization scheme for DRM in P2P file-sharing systems," 2011 IEEE Consumer Communications and Networking Conference (CCNC), Las Vegas, NV, 2011, pp. 136-140.*

K. Liu, Q. Wang, J. Han and H. Wu, "A Privacy Protection Method for P2P-based Web Service Discovery," e-Business Engineering, 2007. ICEBE 2007. IEEE International Conference on, Hong Kong, 2007, pp. 551-558.*

Taiwan Search Report—TW101101140—TIPO—dated Mar. 3, 2014.

3rd Generation Partnership Project; Technical Specification Group Core Network and Terminals; Non-Access-Stratum (NAS) protocol for Evolved Packet System (EPS); Stage 3 (Release 10), 3GPP Standard; 3GPP TS 24.301, 3rd Generation Partnership Project (3GPP), Mobile Competence Centre; 650, Route Des Lucioles; F-06921 Sophia-Antipolis Cedex; France, No. V10.1.0, Dec. 21, 2010, pp. 1-305, XP050462346, [retrieved on Dec. 21, 2010].

"3rd Generation Partnership Project; Technical Specification Group Radio Access Network; Evolved Universal Terrestrial Radio Access (E-UTRA); Radio Resource Control (RRC); Protocol specification (Release 10)", 3GPP Standard; 3GPP TS 36.331, 3rd Generation Partnership Project (3GPP), Mobile Competence Centre ; 650, Route Des Lucioles ; F-06921 Sophia-Antipolis Cedex ; France, No. V10.0.0, Dec. 19, 2010 (Dec. 19, 2010) pp. 1-276, XP050462133, [retrieved on Dec. 19, 2010] paragraphs [5.3.3.1], [5.3.4.1].

3rd Generation Partnership Project; Technical Specification Group Services and System Aspects; 3G security; Access security for IP-based services (Release 11), 3GPP Standard; 3GPP TS 33.203, 3rd Generation Partnership Project (3GPP), Mobile Competence Centre ; 650, Route Des Lucioles; F-06921 Sophia-Antipolis Cedex ; France, No. V11.0.0, Dec. 30, 2010, pp. 1-114, XP050462482, [retrieved on Dec. 30, 2010].

International Search Report and Written Opinion—PCT/US2012/020956—ISA/EPO—dated Sep. 3, 2012.

Kandala S et al., "IEEE 802.11-02/438r2: Wireless LANs, Direct Link Protocol Specification", IEEE Wireless LAN Conference, XX, XX, Sep. 11, 2002 (Sep. 11, 2002), pp. 1-12, XP002314796, paragraphs [05.9]-[7.4.4.2].

Partial International Search Report—PCT/US2012/020956—ISA/EPO—dated Jul. 4, 2012.

3GPP TS 24.301: "3rd Generation Partnership Project; Technical Specification Group Core Network and Terminals; Non-Access-Stratum (NAS protocol for Evolved Packet System (EPS); Stage 3", Release 8, Version 8.8.0, Dec. 2012, pp. 1-276.

Taiwan Search Report—TW103143118—TIPO—dated Jan. 29, 2016.

* cited by examiner

SYSTEM AND METHOD FOR PEER-TO-PEER AUTHORIZATION VIA NON-ACCESS STRATUM PROCEDURES

CROSS-REFERENCE TO RELATED APPLICATION

This application claims priority pursuant to 35 U.S.C. §119(e) to U.S. provisional application Ser. No. 61/431,765, filed Jan. 11, 2011, which is hereby incorporated by reference in its entirety.

FIELD

The present application relates generally to wireless communications, and more specifically to the authorization of wireless devices for peer-to-peer communication.

BACKGROUND

The 3rd Generation Partnership Project (3GPP) Long Term Evolution (LTE) represents a major advance in cellular technology and is the next step forward in cellular 3G services as a natural evolution of Global System for Mobile communications (GSM) and Universal Mobile Telecommunications System (UMTS). The LTE physical layer (PHY) is a highly efficient means of conveying both data and control information between an evolved NodeB (eNB) and mobile entities, such as, for example, access terminals (ATs) or user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single-Carrier Frequency Division Multiple Access (SC-FDMA) on the uplink (UL). OFDMA allows data to be directed to or from multiple users on a subcarrier-by-subcarrier basis for a specified number of symbol periods.

Examples of older wireless communication systems widely deployed to provide various types of communication content such as voice and data include Code Division Multiple Access (CDMA) systems, including CDMA2000, Wideband CDMA, Global System for Mobile communications (GSM), and Universal Mobile Telecommunication System (UMTS). These wireless communication systems and LTE systems generally use different radio access technologies (RATs) and communication protocols, operate at different frequency bands, provide different quality of service (QoS), and offer different types of services and applications to the system users.

In a direct wireless connection, a first mobile entity transmits a wireless signal directly to a second mobile entity, which receives and processes the wireless signal. Examples of direct wireless connections include connections from a mobile entity to NodeB(s) in LTE or other wireless communications protocols, or peer-to-peer (P2P) connections between mobile entities as used in non-cellular protocols such as WiFi Direct or Bluetooth. Cellular wireless communications systems do not typically include direct connections between mobile entities. Rather, the mobile entities typically communicate indirectly with one another through one or more NodeBs and associated network infrastructure. In this context, there is a need for efficiently managing the authorization of mobile entities for P2P communication.

SUMMARY

In a cellular wireless communication system, it may be desirable to implement P2P communications within a system that also uses cellular communications between base stations (e.g., NodeBs) and mobile entities. As used herein, "P2P" refers to communication or signaling between peer mobile entities, in contrast to "cellular," which refers to wireless communications between mobile entities and base stations. P2P, as used herein, excludes communications between peer base stations or other peer nodes of the wireless communications system. P2P communications as defined above may sometimes be referred to as device-to-device, abbreviated as "D2D." Mobile entities as a group are distinct from base stations, and may be distinguished from base stations by various factors known in the art; for example, a base station typically includes a backhaul connection to the core network and support for related interface components, while mobile entities lack such components and are generally portable. In other respects mobile entities may include components also found in base stations, for example, processor, memory, and transceiver components.

When a wireless communications system that supports both cellular and P2P communications in one or more overlapping area, issues may arise related to interference between cellular and P2P wireless signaling in an area. Various control methodologies may be used to coordinate P2P and cellular signaling in an area so as to minimize interference between these communication modes. One aspect of such control methodologies may include authorizing a mobile entity to initiate a communication session in which the mobile entity operates in a P2P mode with another mobile entity. Such authorizing may be referred to herein as a P2P authorization. It should be understood that, unless authorized to operate in a P2P mode, the mobile entity may generally operate in a cellular mode. P2P authorization may be performed by one or more entities of a wireless communication system, in cooperation with other entities of the system.

In an aspect, a first method for peer-to-peer (P2P) authorization by a mobile entity may include receiving a P2P authorization accept message from a management entity via a non-access stratum (NAS). "First method," "second method," etc., are used merely as labels of convenience to refer to different methods for P2P authorization, and do not describe or suggest any temporal order, order of preference or priority, or other relationship between the various methods. The first method may further include receiving, by the mobile entity, a radio resource control (RRC) P2P configuration request from a network entity. The first method may further include sending, from the mobile entity, an RRC P2P configuration complete message to the network entity via an access stratum. In an aspect of the first method, the mobile entity may be, or may include, a user equipment (UE), the management entity may comprise a mobile management entity (MME), and the network entity may comprise an evolved NodeB (eNB).

In a related aspect, the first method may further include the mobile entity sending a P2P authorization request message to the management entity via the NAS. The first method may further include the mobile entity transmitting a P2P authorization complete message to the management entity via the NAS.

In an aspect, the P2P authorization comprises an authorization for discovery; i.e., the mobile entity may be authorized thereby to discover another peer mobile entity for prospective P2P communications. In another aspect, the P2P authorization may include an authorization for direct communication. That is, the P2P authorization may authorize P2P communication between the mobile entity and another peer device.

In an aspect of the first method, receiving the P2P authorization accept message may include the mobile entity receiving an activate default Evolved Packet System (EPS) bearer context message. In such case, the first method may further include the mobile entity transmitting an activate default EPS bearer context accept message to the management entity via the NAS. In another aspect of the first method, receiving the P2P authorization accept message may include receiving an activate dedicated EPS bearer context message. In such case, the first method may further include transmitting an activate dedicated EPS bearer context accept message to the management entity via the NAS.

A second method may relate to P2P authorization by a management entity. The second method may include the management entity receiving a P2P authorization request message from a mobile entity via NAS. The second method may further include performing, by the management entity, at least one P2P authorization check of the mobile entity based at least in part on the received P2P authorization request message. The second method may further include, in response to the at least one check being successful, the management entity sending a P2P authorization accept message to a mobile entity via the NAS. In an aspect of the second method, the mobile entity may comprise a UE and the management entity may comprise an MME.

In another aspect of the second method, performing the at least one check may include determining whether a specific ID or specific prefix associated with the mobile entity matches a subscription of the mobile entity. In the alternative, or in addition, performing the at least one check may include determining whether a specific ID or specific prefix associated with the mobile entity is unexpired.

As in the first method, the P2P authorization in the second method may include an authorization for discovery. In the alternative, or in addition, the P2P authorization may include an authorization for direct communication.

In an aspect of the second method, receiving the P2P authorization request message may include the management entity receiving a Packet Data Network (PDN) connectivity request message. In addition, sending the P2P authorization accept message may include the management entity sending an activate default EPS bearer context message.

The second method may further include the management entity receiving an activate default EPS bearer context accept message from the mobile entity via the NAS. In an aspect of the second method, receiving the P2P authorization request message may include receiving a bearer resource allocation request message at the management entity. In addition, sending the P2P authorization accept message may include sending an activate dedicated EPS bearer context message from the management entity. In another aspect, the second method may include receiving, by the management entity, an activate dedicated EPS bearer context accept message from the mobile entity via the NAS.

A third method for P2P authorization by a mobile entity may include the mobile entity sending a registration message to a core network, the registration message comprising a P2P authorization request. The third method may further include receiving, by the mobile entity, a registration accept message from the core network, the registration accept message comprising an initial context setup request and a P2P authorization response.

In an aspect of the third method, the sending the registration network by the mobile entity may include sending the registration message to a network entity, the network entity forwarding the registration message to the core network. The network entity may include an eNB. In another aspect of the third method, the P2P authorization response may include a P2P authorization accept message, in response to a P2P authorization check of the mobile entity being successful at the core network.

In another aspect of the third method, sending the registration message may include sending an attach request message. In addition, receiving the registration accept message may include receiving an attach accept message. In another aspect of the third method, sending the registration message may include sending a tracking area update (TAU) request message. In addition, receiving the registration accept message may include receiving a TAU accept message. In another aspect of the third method, the P2P authorization may include a general P2P authorization, and the mobile entity may be, or may include, a UE. In this aspect, the third method may further include sending the registration message to a MME of the core network.

A fourth method for P2P authorization may be performed by a management entity of a core network. The fourth method may include receiving, by the management entity, a registration message from a mobile entity, the registration message comprising a P2P authorization request. The fourth method may further include performing, by the management entity, at least one identification check of the mobile entity. The fourth method may further include in response to the at least one identification check being successful, sending a registration accept message to the mobile entity, the registration accept message comprising an initial context setup request and a P2P authorization response.

In an aspect of the fourth method, the management entity may receive the registration message from a network entity in operative communication with the mobile entity. The network entity may be, or may include, an eNB.

In another aspect of the fourth method, the P2P authorization response may be a P2P authorization accept message, provided in response to a P2P authorization check of the mobile entity being successful at the core network.

In an aspect of the fourth method, receiving the registration message may include receiving an attach request message. In addition, sending the registration accept message may include sending an attach accept message. In an alternative aspect, receiving the registration message may include receiving TAU request message, and sending the registration accept message may include sending a TAU accept message. In another aspect of the fourth method, the P2P authorization may include a general P2P authorization and the management entity may be, or may include, a mobile management entity (MME). In such case, the MME may receive the registration message from a user equipment (UE).

In related aspects, a wireless communications apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as mobile entities, management entities, or base stations of various types used for wireless communications. Similarly, an article of manufacture may be provided, including a non-transient computer-readable storage medium holding encoded instructions, which when executed by a processor, cause a wireless communications apparatus to perform the methods and aspects of the methods as summarized above.

Further aspects, embodiments, and details relating to methods and apparatus for authorizing P2P communications in the context of cellular wireless communications systems are described in the detailed description that follows.

BRIEF DESCRIPTION OF THE DRAWINGS

The features, nature, and advantages of the present disclosure will become more apparent from the detailed description set forth below when taken in conjunction with the drawings described below. Throughout the drawings and detailed description, like reference characters may be used to identify like elements appearing in one or more of the drawings.

DETAILED DESCRIPTION

Figure 1:
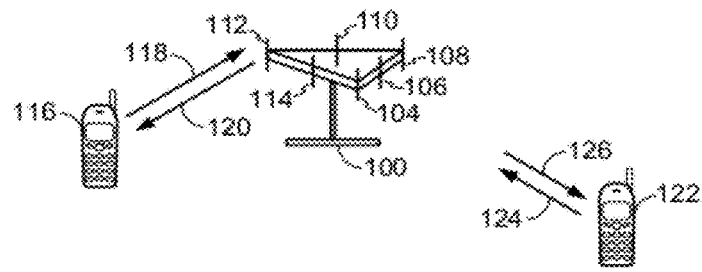
FIG. 1 illustrates a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA networks, etc. The terms "networks" and "systems" are often used interchangeably. A CDMA network may implement a radio technology such as Universal Terrestrial Radio Access (UTRA), CDMA2000, or other radio technologies. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards may represent cellular wireless technologies that are known in the art. In the following description, for reasons of conciseness and clarity, terminology associated with W-CDMA and LTE standards, as promulgated under the 3GPP standards by the International Telecommunication Union (ITU), is used. It should be emphasized that the techniques described herein are applicable to other technologies, such as the technologies and standards mentioned above.

Single-Carrier Frequency Division Multiple Access (SC-FDMA), which utilizes single carrier modulation and frequency domain equalization, has similar performance and essentially the same overall complexity as those of OFDMA systems. An SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. SC-FDMA is used for uplink multiple access in 3GPP LTE, or Evolved UTRA.

Referring to FIG. 1, a multiple access wireless communication system according to one embodiment is illustrated. An access point 100 (e.g., base station, evolved NodeB (eNB), or the like) includes multiple antenna groups, one including 104 and 106, another including 108 and 110, and an additional one including 112 and 114. In FIG. 1, two antennas are shown for each antenna group, however, more or fewer antennas may be utilized for each antenna group. A mobile entity 116 is in communication with the antennas 112 and 114, where the antennas 112 and 114 transmit information to the mobile entity 116 over a forward link 120 and receive information from the mobile entity 116 over a reverse link 118. A mobile entity 122 is in communication with the antennas 104 and 106, where the antennas 104 and 106 transmit information to the mobile entity 122 over a forward link 126 and receive information from the mobile entity 122 over a reverse link 124. In a Frequency Division Duplex (FDD) system, the communication links 118, 120, 124 and 126 may use different frequencies for communication. For example, the forward link 120 may use a different frequency than that used by the reverse link 118.

Each group of antennas and/or the area in which they are designed to communicate is often referred to as a sector of the access point. In certain embodiments, antenna groups each are designed to communicate with mobile entities in a sector, of the areas covered by the access point 100.

In communication over the forward links 120 and 126, the transmitting antennas of the access point 100 may utilize beamforming in order to improve the signal-to-noise ratio of forward links for the different mobile entities 116 and 122. Also, an access point using beamforming to transmit to mobile entities scattered randomly through its coverage causes less interference to mobile entities in neighboring cells than an access point transmitting through a single antenna to all its mobile entities.

An access point may be a fixed station used for communicating with the terminals and may also be referred to as an access point, a NodeB, an eNB, or some other terminology. A mobile entity may also be referred to as an access terminal (AT), a user equipment (UE), a mobile station, a wireless communication device, terminal, or the like.

Figure 2:
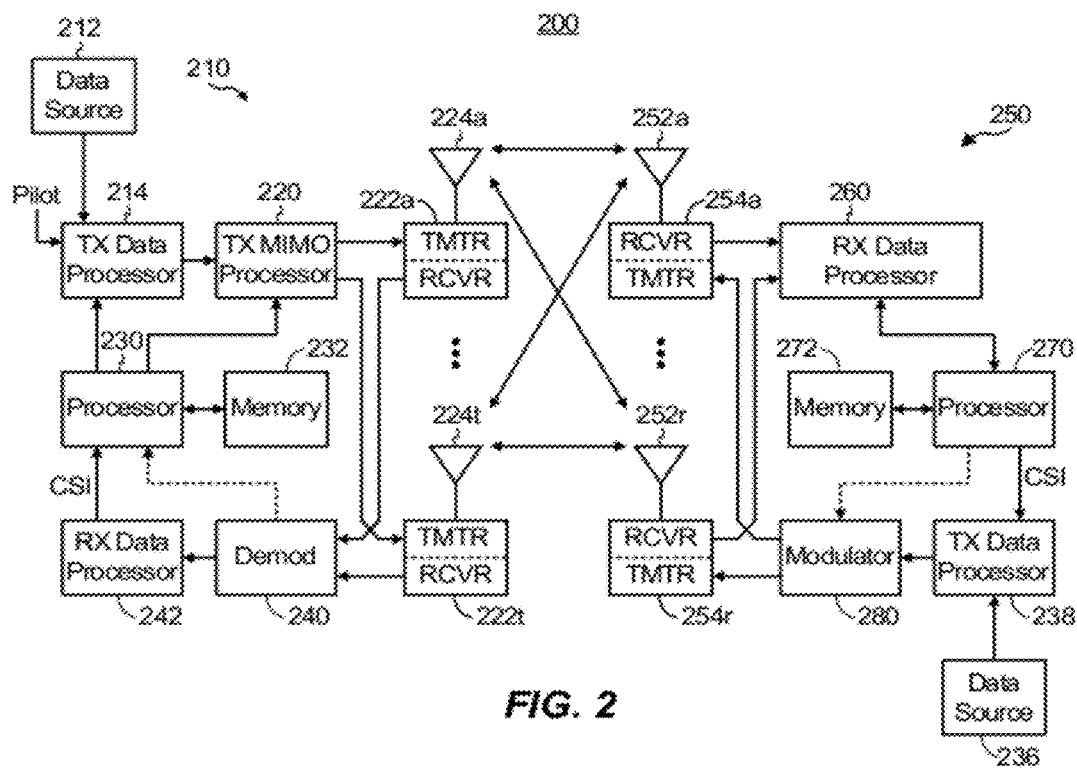
FIG. 2 illustrates a block diagram of a communication system.

FIG. 2 is a block diagram of an embodiment of a transmitter system 210 (also known as an access point) and a receiver system 250 (also known as a mobile entity) in a MIMO system 200. The transmitter system 210 and receiver system 250 may include other components that are not shown in FIG. 2. For example, the transmitter system 210 may include a wired and/or wireless interface for a backhaul connection, while the receiver system 250 may lack any backhaul interface and may be configured for portability, for example by including a portable battery system, a battery recharging system, and power conservation components. In contrast, the transmitter system 210 may lack a portable battery system or related components, and may be configured for connecting to an external power supply. Under such interpretation, the system 200 may be understood as illustrating a cellular communications configuration including a base station 210 and a mobile entity 250. It should also be appreciated that the system 200 may also be interpreted as depicted peer mobile entities in a P2P configuration, with transmitter system 210 being a first peer mobile entity and receiver system 250 being a second peer mobile entity. FIG. 2, therefore may be interpreted as depicting either cellular or P2P configurations, and is not inconsistent with a dual P2P-cellular configuration.

At the transmitter system 210, traffic data for a number of data streams is provided from a data source 212 to a transmit (TX) data processor 214.

In an embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230, which may be in operative communication with a memory 232.

The modulation symbols for the data streams are then provided to a TX MIMO processor 220, which may further process the modulation symbols (e.g., for OFDM). The TX MIMO processor 220 then provides $N_T$ modulation symbol streams to $N_T$ transmitters (TMTR) 222a through 222t. In certain embodiments, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At the receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

A RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use. The processor 270 formulates a reverse link message comprising a matrix index portion and a rank value portion, and may be in operative communication with a memory 272. The processor 270 may be operatively coupled to the memory 272. The memory 272 may hold program instructions and/or data, that when executed by the processor 270, causes the receiver 250 to perform one or more of the P2P authorization methodologies described in more detail later in the specification for performance by a mobile entity.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by the transmitters 254a through 254r, and transmitted back to the transmitter system 210.

At the transmitter system 210, the modulated signals from the receiver system 250 are received by the antennas 224, conditioned by the receivers 222, demodulated by a demodulator 240, and processed by a RX data processor 242 to extract the reserve link message transmitted by the receiver system 250. The processor 230 then determines which pre-coding matrix to use for determining the beamforming weights then processes the extracted message. The processor 230 may be operatively coupled to the memory 232. The memory 232 may hold program instructions and/or data, that when executed by the processor 230, causes the transmitter 210 to perform operations of a network entity, for example a base station, as described in more detail later in the specification. In the alternative, if system 200 is interpreted as depicting a P2P configuration between peer mobile entities, the memory 232 may hold program instructions and/or data, that when executed by the processor 230, causes the transmitter 210 to perform one or more P2P authorization methodologies for performance by a mobile entity as described in more detail later in the specification.

Figure 3:
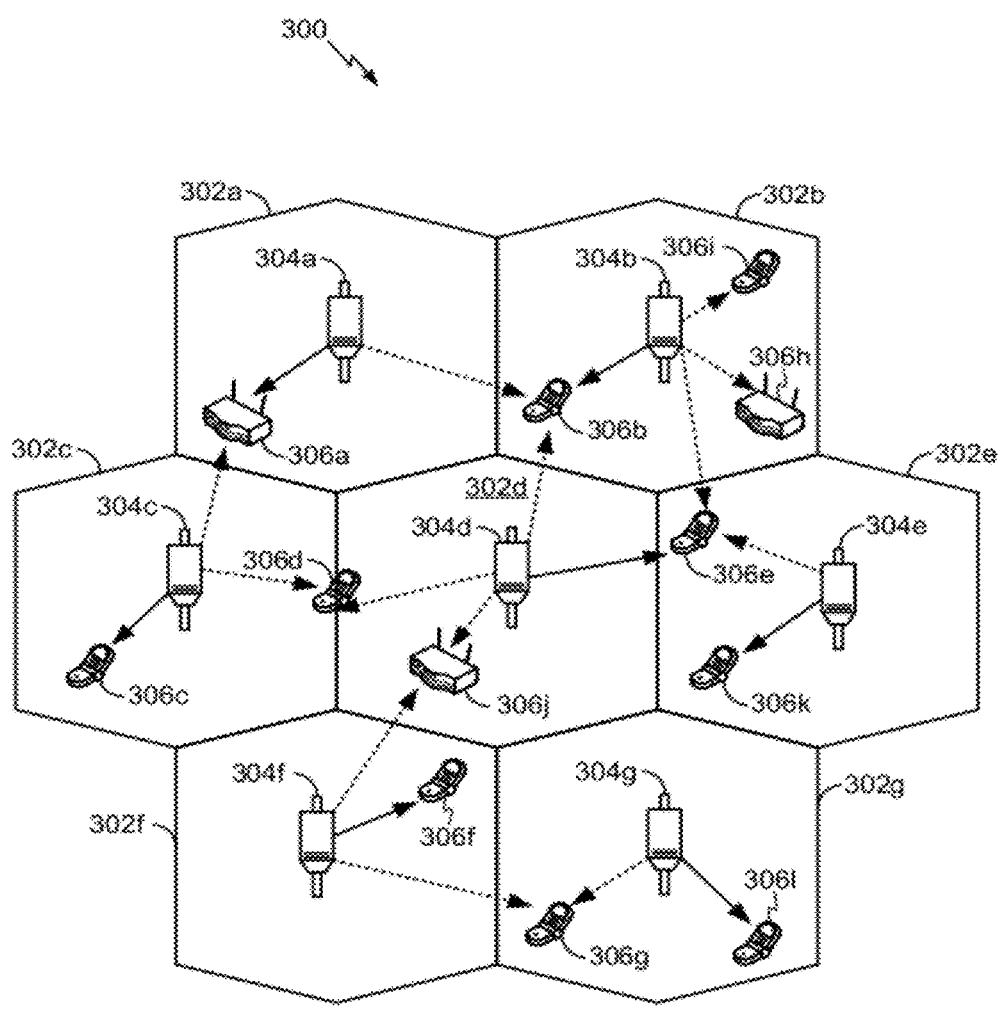
FIG. 3 illustrates a cellular wireless communication system configured to support a number of users.

FIG. 3 illustrates a wireless communication system 300, configured to support a number of users, in which the teachings herein may be implemented. The system 300 provides communication for multiple cells 302, such as, for example, macro cells 302a-302g, with each cell being serviced by a corresponding access node 304 (e.g., access nodes 304a-304g). As shown in FIG. 3, mobile entities 306 (e.g., mobile entities 306a-306l) may be dispersed at various locations throughout the system over time. Each mobile entity 306 may communicate with one or more access nodes 304 on a forward link ("FL") and/or a reverse link ("RL") at a given moment, depending upon whether the mobile entity 306 is active and whether it is in soft handoff (if applicable), for example. The wireless communication system 300 may provide service over a large geographic region. For example, macro cells 302a-302g may cover a few blocks in an urban or suburban neighborhood or a few square miles in a rural environment. Each of the access nodes 304a-304g may include a backhaul interface for a connection to a core network (not shown). The core network may include various network entities for controlling operation of the system 300 and interoperations with other networks, for example, the core network may include an MME, which may be configured as a computer server including processing modules configured for mobility management functions. In an aspect, these function may include P2P authorization methodologies as disclosed in more detail later in the specification.

In accordance with aspects of the subject of this disclosure, there is provided a wireless network (e.g., a 3GPP network) having a feature for using a spectrum provider (e.g., an LTE network provider) for peer-to-peer (P2P) communication, and more particularly for managing spectrum to enable or enhance concurrent P2P and cellular use within a common area. In this context, P2P communication is a direct communication between two or more mobile entities without the need for transportation of communicated data through an access node or a core network node. As noted above, in a cellular system P2P communication may supplement, but not entirely replace, a cellular communication mode more generally used between mobile entities and base stations for voice and data communications.

Figure 4:
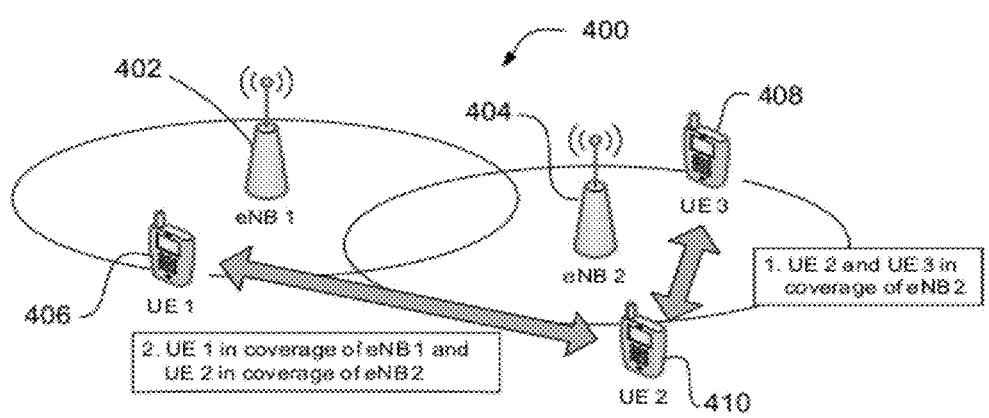
FIG. 4 illustrates mobile entities in communication via a radio access network and via direct wireless connections.

FIG. 4 shows an embodiment of a communication system 400 comprising mobile entities 406, 408, 410 in communication via eNBs 402, 404 of a radio access network (RAN) and via direct wireless connections. The depicted example illustrates peer discovery for (1) UEs 408, 410 camped at a cell on the same eNB 404 and (2) UEs 406, 410 camped at cells for respective different eNBs 402, 404. Peer discovery is a procedure whereby UEs detect the availability of other services advertised at UEs within radio frequency (RF) proximity, and may generally involve peer advertisement by mobile entities and peer detection by mobile entities of services advertised by mobile entity peers.

Peer mobile entities may perform detection, wherein authorized mobile entities may receive information to be able to perform detection (e.g., security keys or the like). Also, the peer mobile entities may perform advertising, wherein authorized mobile entities may receive information to be able to advertise a discovery identifier (e.g., security keys). Each mobile entity refrains from advertising a discovery identifier for which it has not been authorized. Further, the peer mobile entities may perform direct communication, wherein each mobile entity refrains from establishing direct communication with a peer advertising a discovery identifier for which it has not been authorized. The core network may control authorization for P2P operations, including for example peer detection, peer advertisement, and P2P communication, using one or more network entities, for example, an MME.

A network or spectrum provider may authorize a mobile entity to use the network's spectrum to perform the above described P2P communication procedures. The mobile entity may not be provisioned with P2P parameters and may be expected to request authorization for each procedure or set of procedures. For example, the mobile entity may request authorization for detection, detection and advertising, and/or direct communication. Authorization based on the techniques described herein could be: (a) per tracking area for tracking area update (TAU) procedures; (b) while attached for attach procedures; and/or (c) based on a lifetime of reserved bearers for evolved packet system (EPS) session management (ESM) procedures.

In accordance with one or more aspects of the embodiments described herein, there are provided techniques for P2P authorization using non-access stratum (NAS) procedures. As known in the art, an access stratum refers to a functional layer in a telecommunications stack (e.g., UMTS or LTE) between the radio network and the UE used for radio access and communication. A non-access stratum similarly refers to a functional layer in a telecommunications stack (e.g., UMTS or LTE) between the core network and the UE used for control functions, for example mobility management, call control, session management or identity management. Accordingly, a NAS procedure refers to a procedure that uses the NAS.

For P2P authorization using NAS procedures, two general types of techniques may be used. The first technique type may include ESM procedures, including P2P authorization based on new ESM procedures and P2P authorization based on existing ESM procedures. The second technique type may include P2P authorization based on EPS mobility management (EMM) P2P procedures. In related aspects, P2P subscription data for a given mobile entity may be delivered to a management entity, such as, for example, an MME, by a home subscriber server (HSS) or the like using an insert subscriber data type procedure.

Turning first to P2P authorization based on new ESM procedures, this procedure may be used to request authorization for advertising each discovery identifier or for establishing each direct peer communication from a management entity (e.g., MME). This P2P authorization procedure may also be applied to a single general authorization for P2P service.

Figure 5:
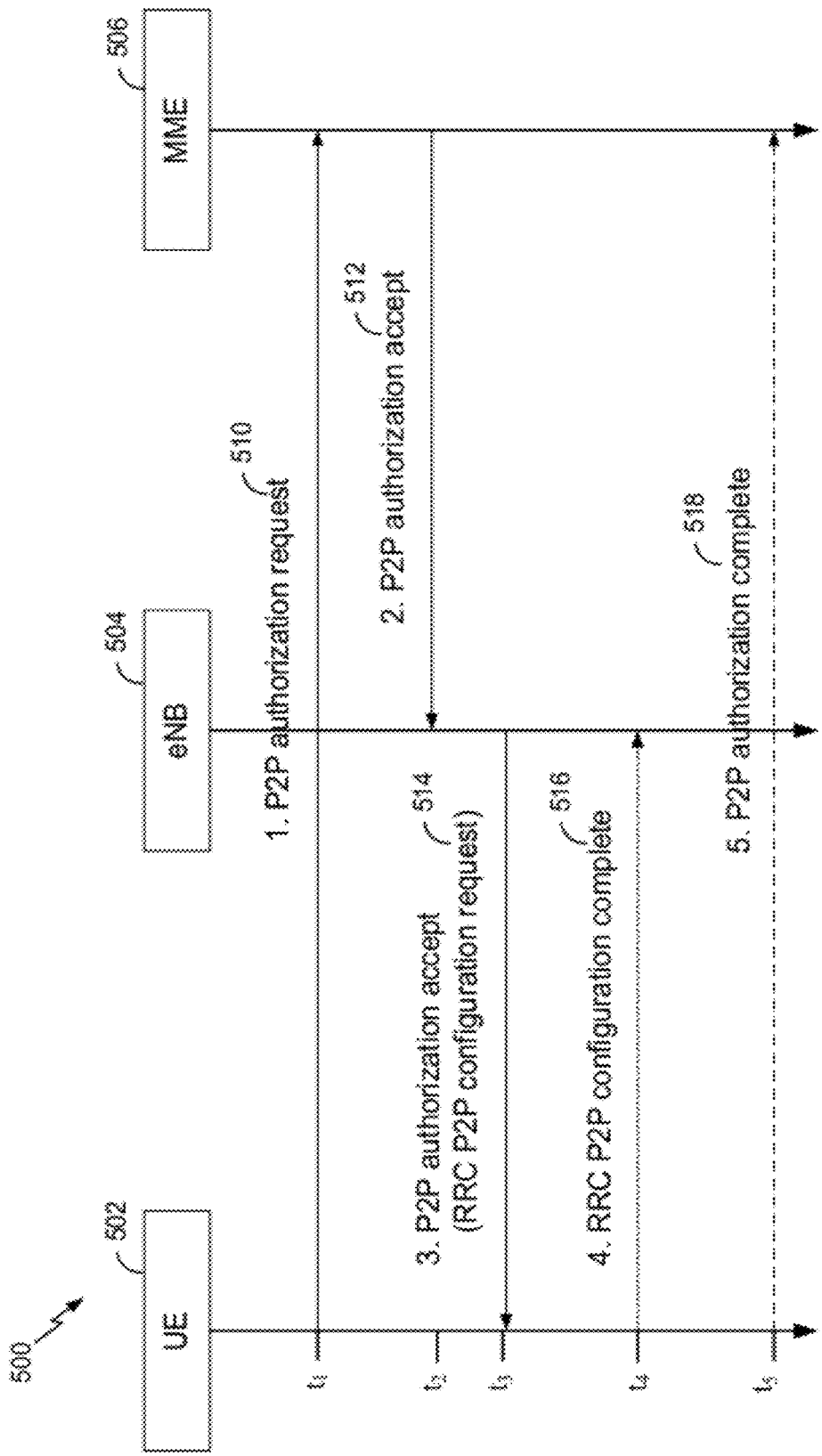
FIG. 5 is a call flow diagram for an embodiment of a wireless network enhanced for P2P authorization based on new ESM procedures.

With reference to FIG. 5, in one embodiment, a system 500 may comprise at least one mobile entity (e.g., a UE 502), at least one network entity (e.g., an eNB 504), and at least one management entity (e.g., an MME 506) of a core network. As shown, the UE 502 may optionally send a P2P authorization request message 510 to the MME 506 via the NAS at time $t_1$. The P2P authorization message may be, or may include, one or more identifiers or other data signals that are recognizable by the network entity as a request to perform one to more P2P operations. At $t_2$, if the UE 502 requests authorization for a specific discovery identifier, the MME 506 may check whether the discovery identifier is contained in a subscription of the UE 502 and/or verify that the discovery identifier is not expired. If the discovery identifier is not present or is expired, the MME 506 may send a corresponding NAS reject message to the UE 502 with a corresponding cause value (e.g., not authorized for this discovery identifier). If all checks are successful, the MME 506 may send an P2P authorization accept message 512 to the UE 502 (via the NAS) and/or the eNB 504 (via the access stratum). The P2P authorization accept message may be, or may include, one or more identifiers or other data signals that are recognizable by the mobile entity as an authorization to perform one to more P2P operations At $t_3$, the eNB 504 may send a radio resource control (RRC) P2P configuration request 514 to the UE 502. The RRC P2P configuration request 514 may be piggybacked to the authorization accept message 512. At $t_4$, the UE 502 may send an RRC configuration complete message 516 to the eNB 504. At $t_5$, the UE 502 may optionally send a P2P authorization complete message 518 to the MME 506 via the NAS.

The above-described new ESM procedure may be initiated by the network and accepted by the UE 502. The UE 502 may trigger the ESM procedure by sending a specific ESM message with a certain procedure transaction ID (PTI) or the like. UE 502 and network behavior for timer expirations, retransmissions, and/or other abnormal scenarios may be handled in a manner that is similar to existing ESM procedures.

In related aspects, the UE 502 may initiate a P2P modify request, such as, for example, to add/replace advertisement or connection establishment of new/existing discovery identifiers, or to modify parameters such as quality of service (QoS). In further related aspects, the MME 506 may initiate a deactivate P2P request, which may be initiated, for example, by a change of subscription data in the HSS or the like.

Turning next to P2P authorization based on existing ESM procedures, this procedure may utilize a packet data network (PDN) connectivity request and EPS bearer context messages (e.g., by activating a default EPS bearer context request, modifying an EPS bearer context request, etc.). This P2P authorization procedure may be used to request authorization for advertising each discovery identifier or for establishing each direct peer communication from an MME or the like, and may also apply to a single general authorization for P2P service. It is noted that P2P authorization based on existing ESM procedures may result in the core network resources being reserved for P2P service due to the corresponding bearers being activated.

Figure 6:
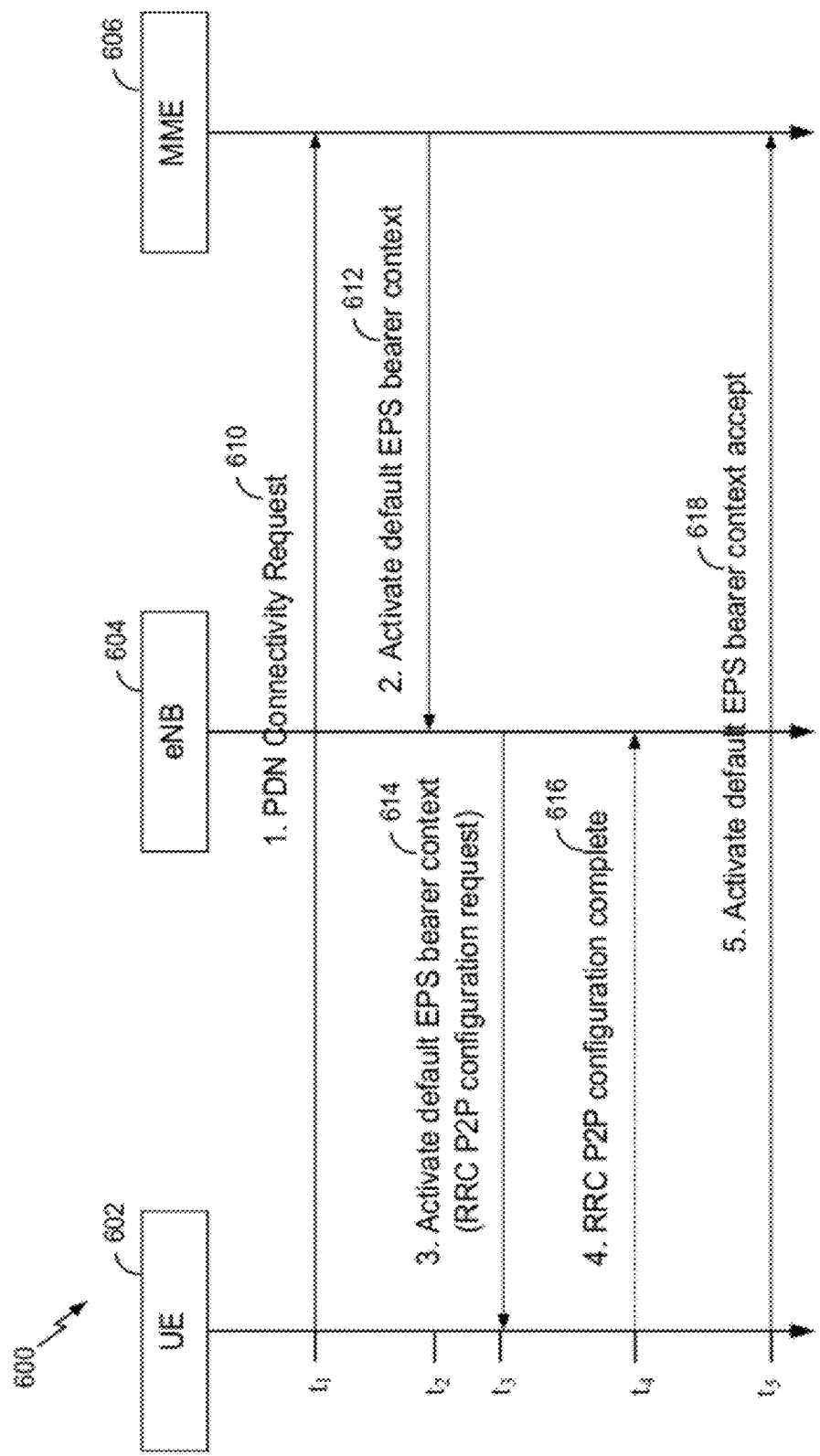
FIG. 6 is a call flow diagram for an embodiment of a wireless network enhanced for P2P authorization for discovery based on existing ESM procedures.

In related aspects, there is provided a P2P authorization for discovery that involves using existing ESM procedures. With reference to FIG. 6, in one embodiment, a system 600 may comprise at least one mobile entity (e.g., a UE 602), at least one network entity (e.g., an eNB 604), and at least one management entity (e.g., an MME 606). The call flow shown in FIG. 6 is substantially similar to the call flow shown in FIG. 5 for the new ESM procedure. As shown in FIG. 6, the UE 602 may optionally send a PDN connectivity request message 610 to the MME 606 via the NAS at time $t_1$. At $t_2$, if P2P authorization checks are successful, the MME 606 may send an activate default EPS bearer context message 612 to the UE 602 (via the NAS) and/or the eNB 604 (via the access stratum). At $t_3$, the eNB 604 may send a radio resource control (RRC) P2P configuration request 614 to the UE 602. The RRC P2P configuration request 614 may be piggybacked to the activate default EPS bearer context message 612. At $t_4$, the UE 602 may send an RRC configuration complete message 616 to the eNB 604. At $t_5$, the UE 602 may optionally send an activate default EPS bearer context accept message 618 to the MME 606 via the NAS.

Reusing the PDN connectivity request may be advantageous in situations where the UE 602 is trying to request connectivity to a particular PDN Gateway (P-GW) for P2P services. Unnecessary overhead may result if particular parameters, such as, for example, EPS bearer ID (EBI), access point name (APN), P-GW address, or EPS QoS, are not requested.

Figure 7:
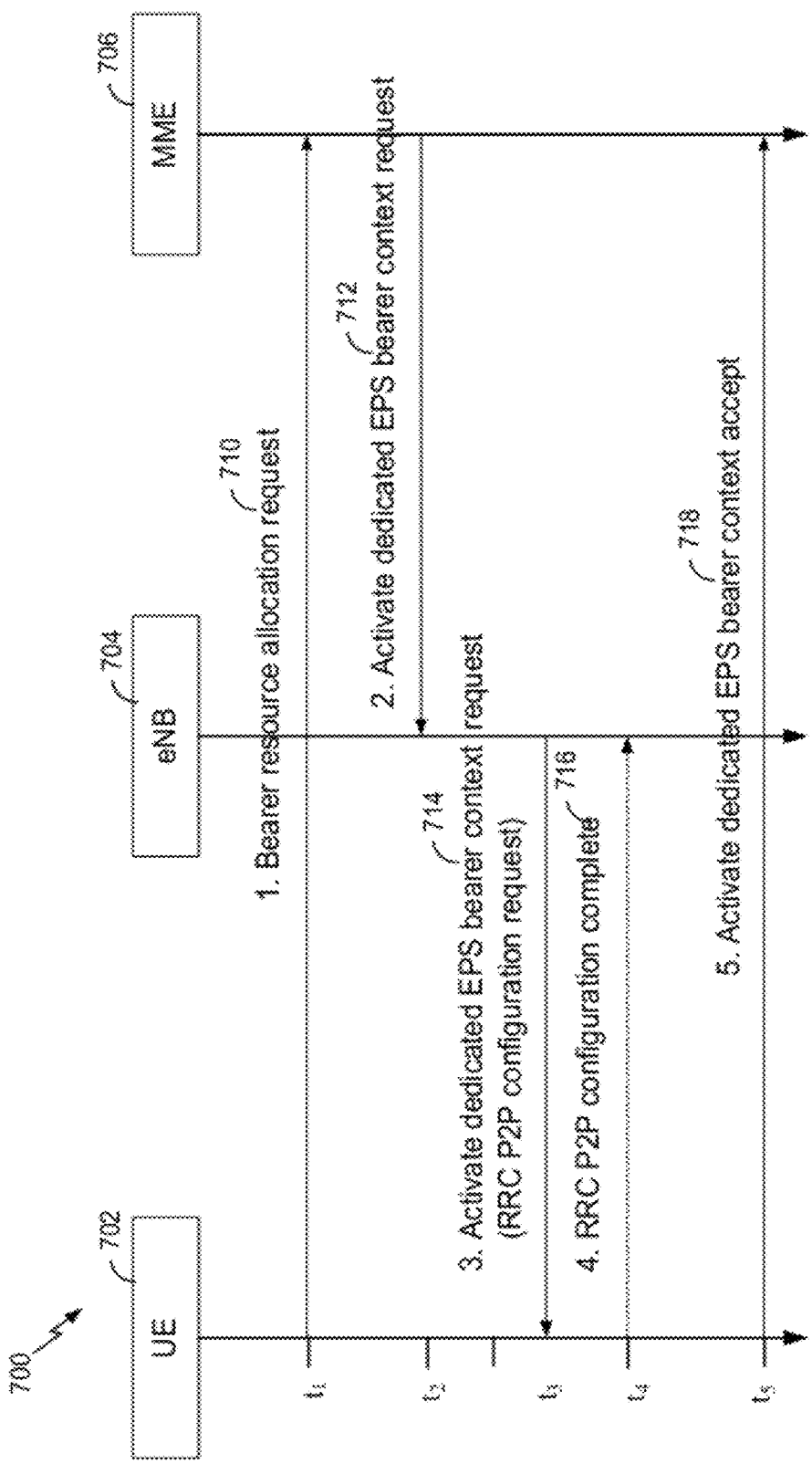
FIG. 7 is a call flow diagram for an embodiment of a wireless network enhanced for P2P authorization for direct communication based on existing ESM procedures.

In further related aspects, there is provided a P2P authorization for direct communication that involves using existing ESM procedures. With reference to FIG. 7, in one embodiment, a system 700 may comprise at least one mobile entity (e.g., a UE 702), at least one network entity (e.g., an eNB 704), and at least one management entity (e.g., an MME 706). The call flow shown in FIG. 7 is substantially similar to the call flows shown in FIGS. 5 and 6. As shown in FIG. 7, the UE 702 may optionally send a bearer resource allocation request message 710 to the MME 706 via the NAS at time $t_1$. At $t_2$, if P2P authorization checks are successful, the MME 706 may send an activate dedicated EPS bearer context message 712 to the UE 702 (via the NAS) and/or the eNB 704 (via the access stratum). At $t_3$, the eNB 704 may send a radio resource control (RRC) P2P configuration request 714 to the UE 702. The RRC P2P configuration request 714 may be piggybacked to the activate dedicated EPS bearer context message 712. At $t_4$, the UE 702 may send an RRC configuration complete message 716 to the eNB 704. At $t_5$, the UE 702 may optionally send an activate dedicated EPS bearer context accept message 718 to the MME 706 via the NAS.

P2P authorization for direct communication could be linked to activating a dedicated bearer with its corresponding QoS, which may be useful for session mobility between a direct P2P link and communication through a Wide Area Network (WAN). In the alternative, or in addition, advertising additional discovery identifiers may be linked to the use of dedicated bearers.

Figure 8:
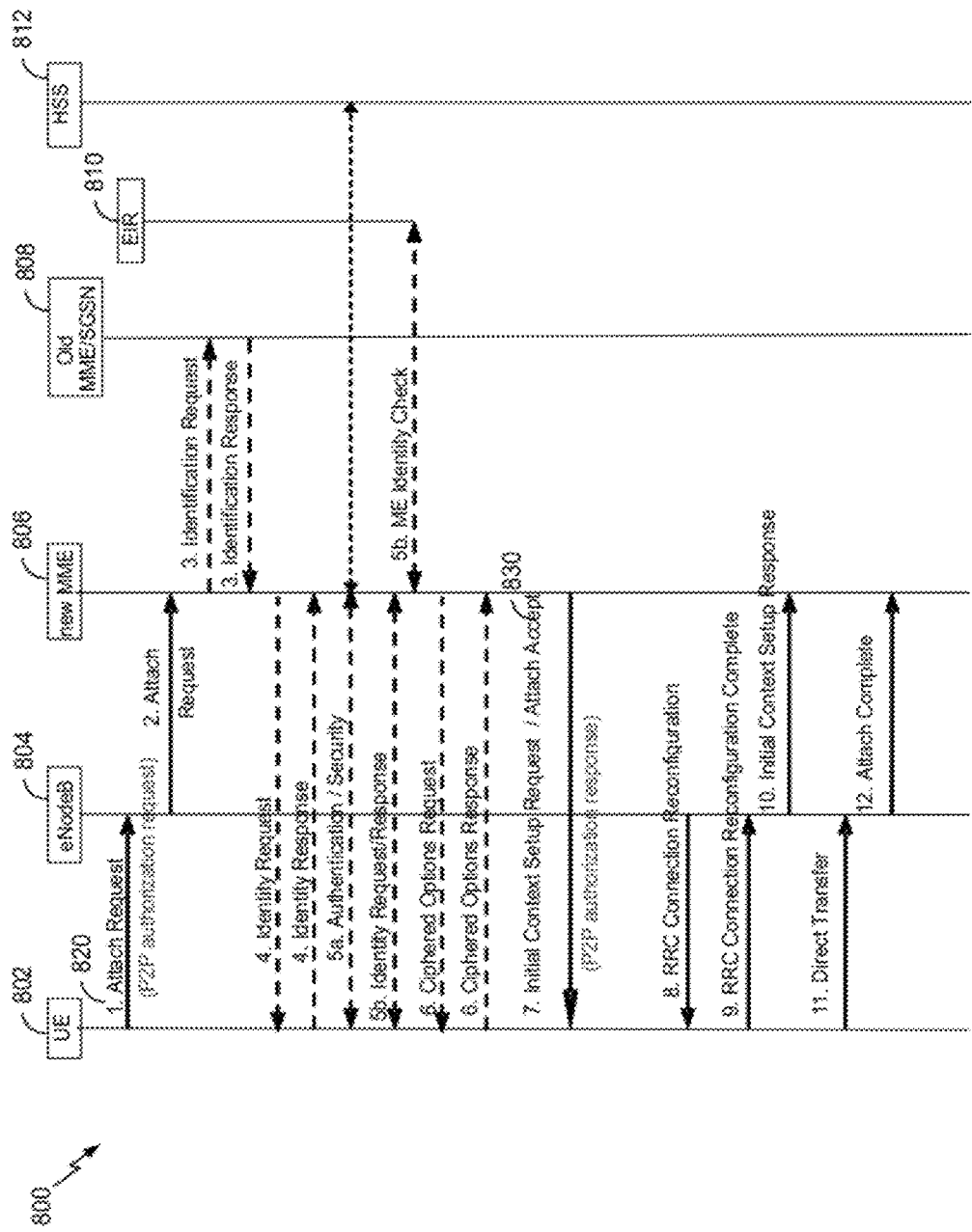
FIG. 8 is a call flow diagram for an embodiment of a wireless network enhanced for general P2P authorization based on an EMM attach procedure.

Turning now to P2P authorization based on existing EMM procedures, the P2P authorization may be piggybacked in attach and/or TAU procedures, which may involve the addition of new information elements (IEs) with P2P specific information. The implementation of EMM procedures may be used primarily for a single general authorization for P2P service. With reference to FIG. 8, there is provided a call flow for a general P2P authorization based on an attach procedure. In one embodiment, a system 800 may comprise at least one mobile entity (e.g., a UE 802), at least one network entity (e.g., an eNB 804), a first management entity (e.g., a new MME 806), a second management entity (e.g., an old MME/SGSN (serving GPRS (general packet radio service) support node)) 808, a first core network entity (e.g., an Equipment Identity Register (EIR) 810), and a second core network entity (e.g., a HSS 812), in operative communication with each other.

The aspects involving identity check, authentication, and authorization are a part of the normal attach procedure; thus, FIG. 8 shows the aspects regarding registration. At $t_1$, the UE 802 may include a P2P authorization request (e.g., P2P or discovery authorization request IE) in a registration message (e.g., attach request message 820), such as, for example, to the new MME 806 via the NAS. Known UE identity checks and authentication may be performed until $t_7$. At $t_7$, the new MME 806 may check P2P subscription data for the UE 802, and may provide a P2P authorization response (e.g., P2P authorization response IE) in a registration accept message (e.g., attach accept message 830) to the UE 802.

In related aspects, the same or similar IEs may be included in a TAU procedure. For example, the TAU procedure may involve including the P2P authorization request IE in a TAU request message from a UE to a MME, as well as including the P2P authorization response IE in a TAU accept message from the MME to the UE. In further related aspects, the P2P authorization may be for the tracking area list included in the attach accept message or the TAU accept message.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored in the form of encoded instructions on an article of manufacture, e.g., a non-transitory computer-readable medium, to facilitate transporting and transferring such methodologies to various devices. When the encoded instructions are executed by a processor, the processor may cause a device that the processor controls to perform a methodology. Those skilled in the art will understand and appreciate that a methodology could alternatively be represented as a series of interrelated states or events, such as in a state diagram.

Figure 9:
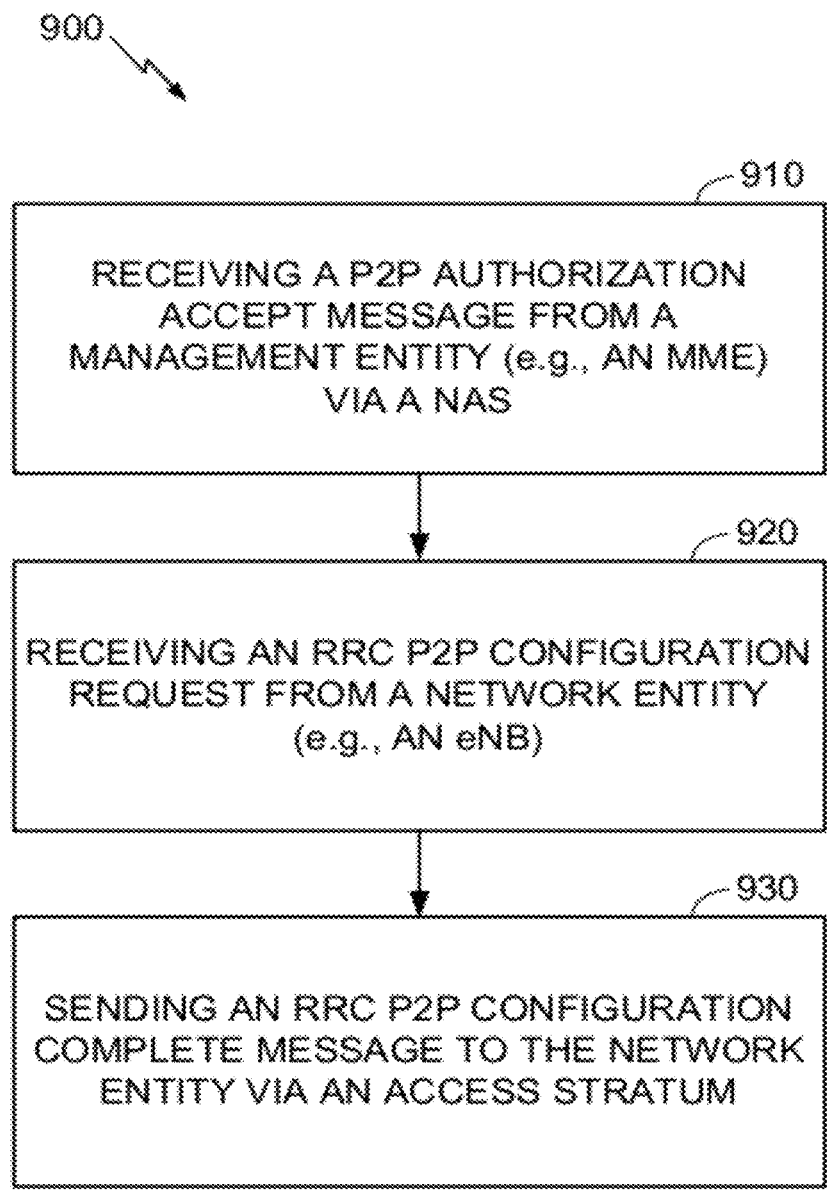
FIG. 9 illustrates an example methodology for P2P authorization based on ESM procedures, performed at a mobile entity.

In accordance with one or more aspects of the subject of this disclosure, there are provided methods for P2P authorization based on ESM procedures. With reference to FIG. 9, illustrated is a methodology 900 that may be performed at a wireless communication apparatus, such as a mobile entity (e.g., a UE). Elements of the methodology 900 may be illustrated in an alternative for in the call flow diagram shown in FIG. 5.

All of the enumerated operations in FIG. 9 may be performed by the mobile entity or similar apparatus for engaging in P2P communications with another peer apparatus. The P2P authorization may be for P2P communications—as distinct from cellular communications between the mobile entity and a base station—in a wireless communications system that also makes uses of cellular communications between base stations and mobile entities. The P2P authorization may operate in a control scheme wherein each mobile entity is required to obtain P2P authorization before initiation of certain P2P operations, including P2P discovery and/or P2P communication. In the absence of P2P authorization, such a control scheme may require that the mobile entity refrain from performing any P2P operations that may interfere with cellular operation, and the mobile entity may therefore be restricted to operating in a cellular mode until P2P authorization is completed.

The method 900 may involve, at 910, the mobile entity receiving a P2P authorization accept message from a management entity (e.g., an MME) via a NAS. The P2P authorization accept message may include one or more data or identifiers that are recognized by the mobile entity as authorizing one or more operations for enabling or supporting a P2P operation. The method 900 may involve, at 920, the mobile entity receiving an RRC P2P configuration request from a network entity (e.g., an eNB). The P2P configuration request may comprise a wireless data signal that the mobile entity recognizes as requesting that the mobile entity configure a P2P operation in a specified way. The method 900 may involve, at 930, the mobile entity sending an RRC P2P configuration complete message to the network entity via an access stratum. The P2P configuration complete message may include data indicating that a specified P2P configuration is complete.

Figure 10:
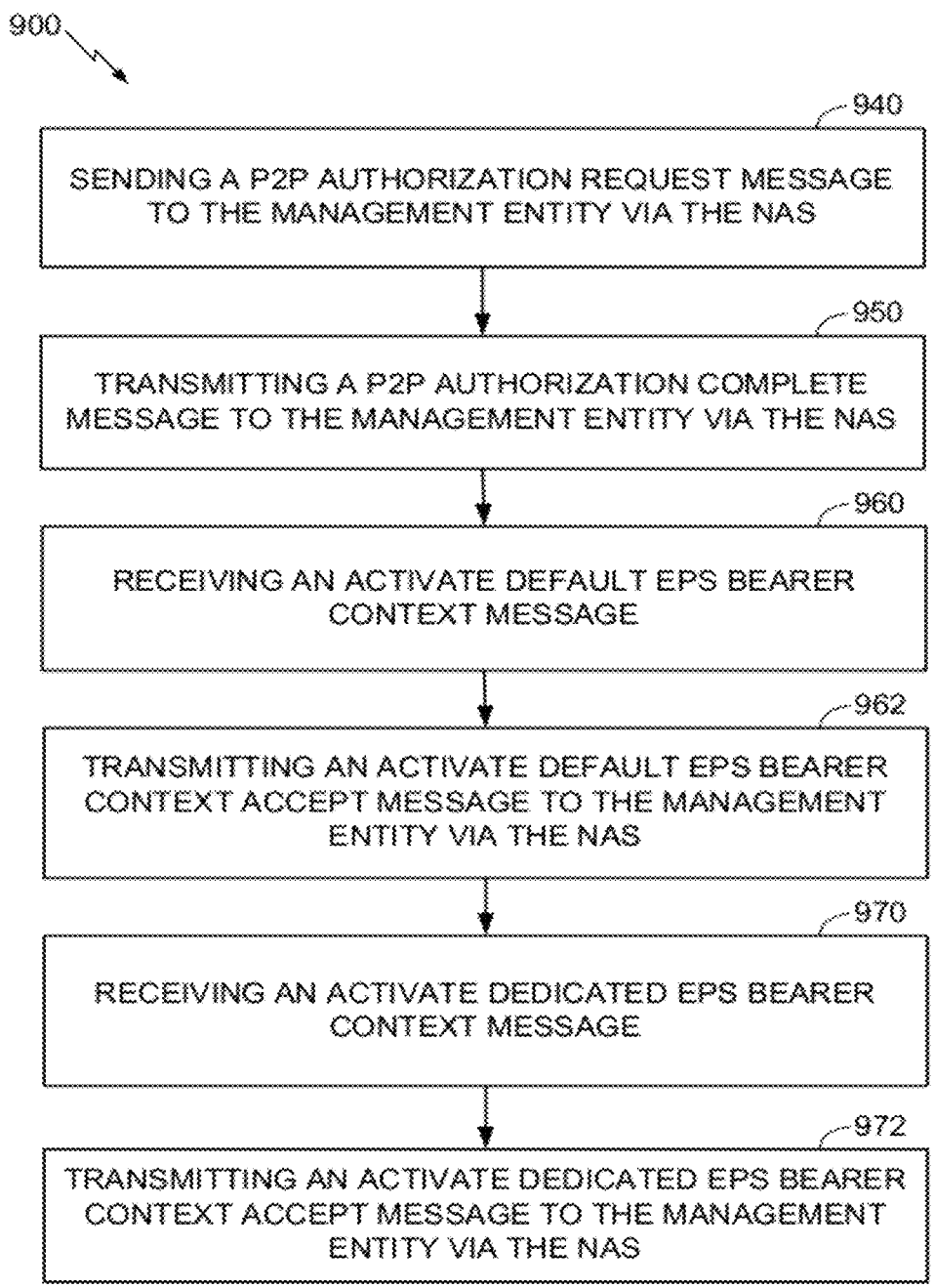
FIG. 10 shows further aspects of the methodology of FIG. 9.

FIG. 10 illustrates additional operations or aspects that may be performed in association with, or as part of, the method 900. One or more of the additional operations shown in FIG. 10 may optionally be performed by the mobile entity as part of method 900, describe an aspect modifying one of the elements of the method 900 or a more detailed algorithm for performing one of the elements of the method 900. These elements may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 900 includes at least one of the operations 940-972, then the method 900 may terminate after the at least one operation, without necessarily having to include any subsequent downstream operation(s) that may be illustrated.

With reference to FIG. 10, the method 900 may further involve, at 940, the mobile entity sending a P2P authorization request message to the management entity via the NAS. This operation 940 may be performed prior to receiving the P2P authorization accept message 910, as also shown at 510 in FIG. 5. The method 900 may further involve, at 950, the mobile entity transmitting a P2P authorization complete message to the management entity via the NAS. This operation 950 may be performed by the mobile entity after sending an RRC P2P configuration complete message to the network entity as shown at block 930 of FIG. 9.

In related aspects, and referring again to FIG. 10, the method 900 for P2P authorization may comprise an authorization for discovery or one or more peer devices within a common area of a cellular wireless communication system. For example, receiving the P2P authorization accept message 910 may involve, at 960, the mobile entity receiving an activate default EPS bearer context message. The method 900 may further involve, at 962, transmitting an activate default EPS bearer context accept message to the management entity via the NAS, in response to the activate default EPS bearer context message.

In further related aspects, the P2P authorization may comprise an authorization for direct communication. Receiving the P2P authorization accept message 910 may involve, at 970, receiving an activate dedicated EPS bearer context message. The method 900 may further involve, at 972, transmitting an activate dedicated EPS bearer context accept message to the management entity via the NAS.

Figure 11:
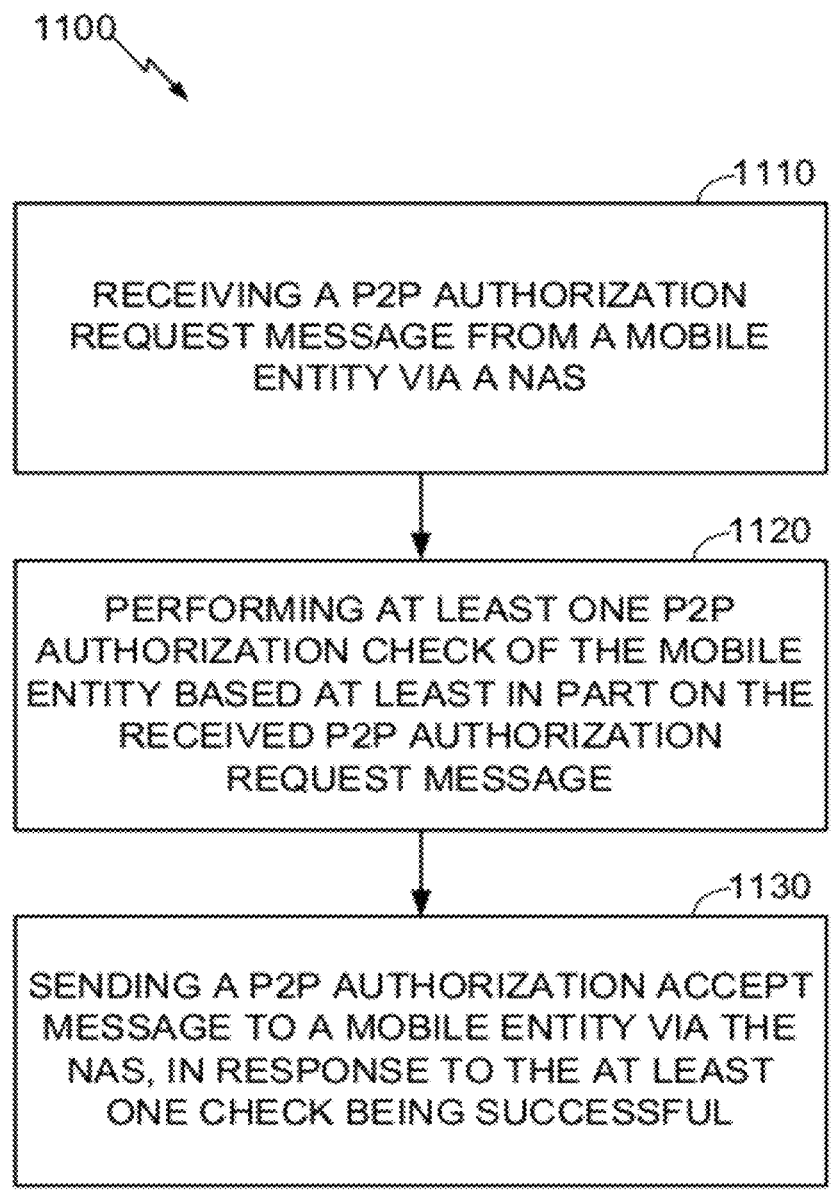
FIG. 11 illustrates an example methodology for P2P authorization based on ESM procedures, performed at a management entity.

In accordance with one or more aspects of the embodiments described herein, FIG. 11 illustrates a P2P authorization methodology 1100 based on ESM procedures, wherein the methodology 1100 may be performed at a management entity, such as an MME or the like. Elements of the methodology 900 may be illustrated in an alternative for in the call flow diagram shown in FIG. 5.

All of the enumerated operations may be performed by the MME or similar apparatus for authorizing P2P communications in a cellular communications network. As noted above P2P communications between mobile entities are distinct from cellular communications between each mobile entity and a base station. The P2P authorization may operate in a control scheme wherein each mobile entity is required to obtain P2P authorization before initiation of certain P2P operations, including P2P discovery and/or P2P communication. In the absence of P2P authorization, such a control scheme may require that the mobile entity refrain from performing any P2P operations that may interfere with cellular operation, and the mobile entity may therefore be restricted to operating in a cellular mode until P2P authorization is completed.

The method 1100 may involve, at 1110, receiving a P2P authorization request message from a mobile entity via a NAS. The method 1100 may involve, at 1120, performing at least one P2P authorization check of the mobile entity based at least in part on the received P2P authorization request message. The method 1100 may involve, at 1130, sending a P2P authorization accept message to a mobile entity via the NAS, in response to the at least one check being successful.

Figure 12:
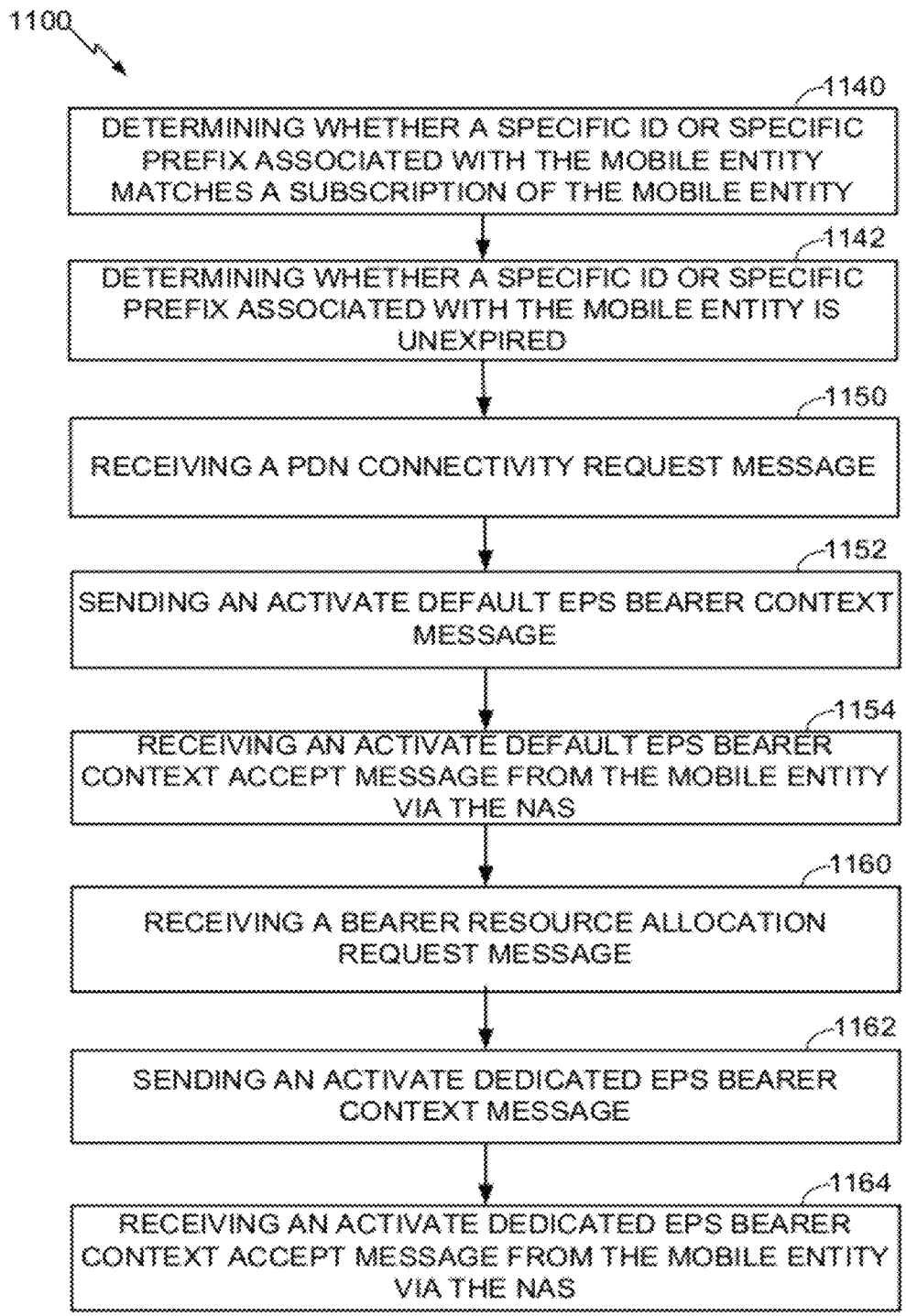
FIG. 12 shows further aspects of the methodology of FIG. 11.

FIG. 12 illustrates additional operations or aspects that may be performed in association with, or as part of, the method 1100. One or more of the additional operations shown in FIG. 12 may optionally be performed by the management entity as part of method 1100, describe an aspect modifying one of the elements of the method 1100, or a more detailed algorithm for performing one of the elements of the method 1100. These elements may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1100 includes at least one of the operations 1140-1164, then the method 1100 may terminate after the at least one operation, without necessarily having to include any subsequent downstream operation(s) that may be illustrated.

With reference to FIG. 12, performing the at least one check 1120 may involve, at 1140, determining whether a specific ID or specific prefix associated with the mobile entity matches a subscription of the mobile entity. In the alternative, or in addition, performing the at least one check may involve, at 1142, determining whether a specific ID or specific prefix associated with the mobile entity is unexpired.

In related aspects, the P2P authorization may comprise an authorization for discovery. In such cases, receiving the P2P authorization request message 1110 may involve, at 1150, receiving a PDN connectivity request message. Sending the P2P authorization accept message 1130 may involve, at 1152 sending an activate default EPS bearer context message to the mobile entity. The method 1100 may further involve, at 1154, receiving an activate default EPS bearer context accept message from the mobile entity via the NAS, in response to the activate default EPS bearer context message.

In further related aspects, the P2P authorization may comprise an authorization for direct communication. In such cases, receiving the P2P authorization request message 1110 may involve, at 1160, receiving a bearer resource allocation request message from the mobile entity. Sending the P2P authorization accept message may involve, at 1162, sending an activate dedicated EPS bearer context message to the mobile entity. The method 1100 may further involve, at 1164, receiving an activate dedicated EPS bearer context accept message from the mobile entity via the NAS, in response to the activate dedicated EPS bearer context message.

Figure 13:
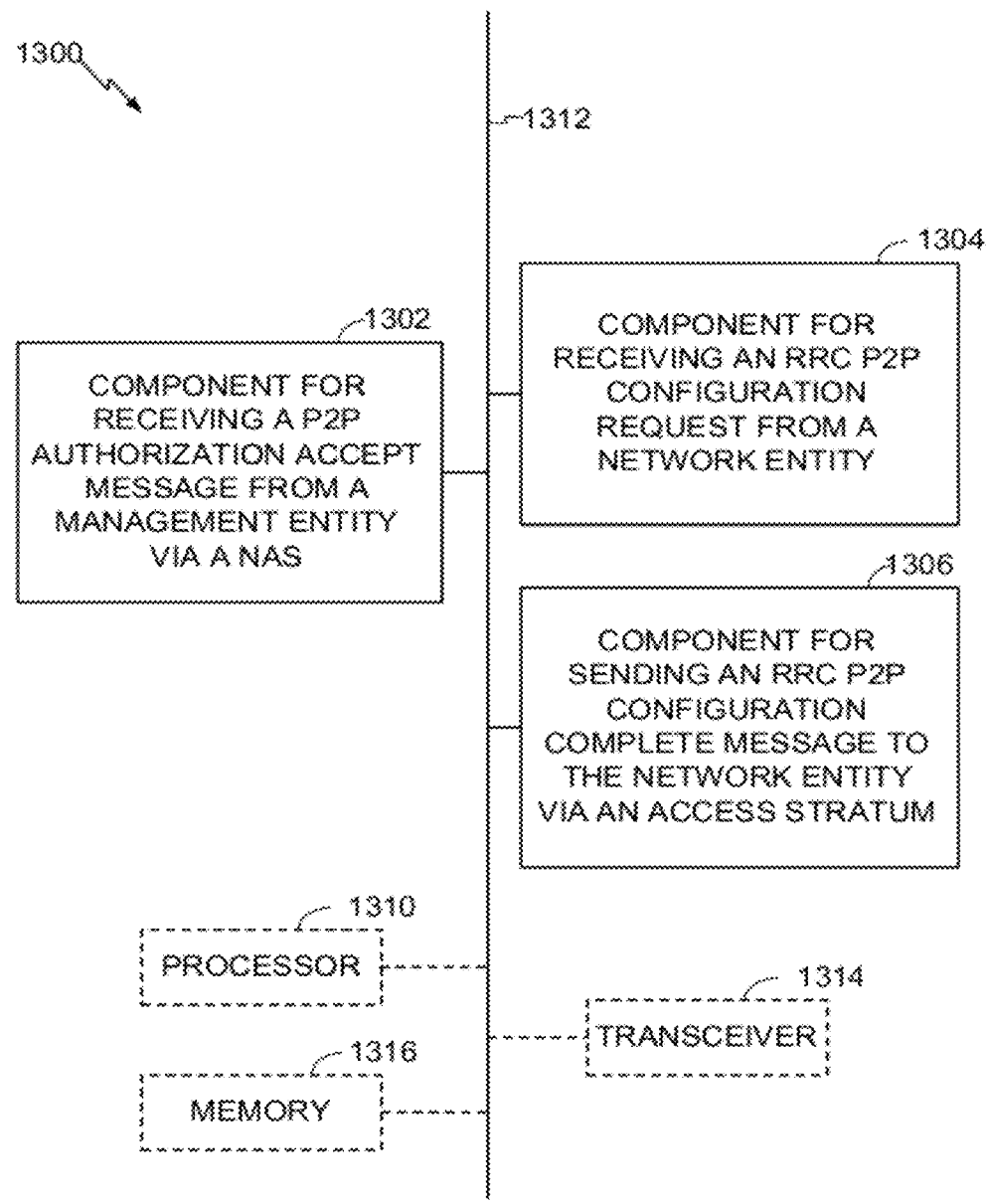
FIG. 13 illustrates an exemplary mobile apparatus for P2P authorization based on ESM procedures, in accordance with the methodologies of FIGS. 9-10.

In accordance with one or more aspects of the embodiments described herein, there are provided devices and apparatuses for P2P authorization based on ESM procedures, as described above with reference to FIGS. 9-10. With reference to FIG. 13, there is provided an exemplary mobile apparatus 1300 that may be configured as a mobile entity in a wireless network, or as a processor or similar device for use within the mobile entity. The apparatus 1300 may include functional blocks that can represent functions implemented by a processor, software, or combination thereof (e.g., firmware). As illustrated, in one embodiment, the apparatus 1300 may comprise an electrical component or module 1302 for receiving a P2P authorization accept message from a management entity via a NAS. The component 1302 may be, or may include, a control processor coupled to a receiver and to a memory, wherein the memory holds encoded instructions for causing a mobile entity to receive a P2P authorization accept message from a management entity via a NAS. The component 1302 may be, or may include, a means for receiving a P2P authorization accept message from a management entity via a NAS. Said means may be or may include the at least one control processor operating an algorithm. The algorithm may include receiving data via the NAS, and recognizing an indication that a specified P2P authorization request has been accepted by the management entity, based on the data. The algorithm may, in the alternative or in addition, include one or more of the detailed operations 960-972 discussed above.

The apparatus 1300 may comprise an electrical component 1304 for receiving an RRC P2P configuration request from a network entity. The component 1304 may be, or may include, a control processor coupled to a receiver and to a memory, wherein the memory holds encoded instructions for causing a mobile entity to receive an RRC P2P configuration request from a network entity. The component 1304 may be, or may include, a means for receiving an RRC P2P configuration request from a network entity. Said means may be or may include the at least one control processor operating an algorithm. The algorithm may include receiving data from a base station via a RRC, and recognizing an indication that a specified P2P configuration is requested, based on the data received via the RRC.

The apparatus 1300 may comprise an electrical component 1306 for sending an RRC P2P configuration complete message to the network entity via an access stratum. The component 1306 may be, or may include, a control processor coupled to a transmitter and to a memory, wherein the memory holds encoded instructions for causing a mobile entity to send an RRC P2P configuration complete message to the network entity via an access stratum. The component 1306 may be, or may include, a means for sending an RRC P2P configuration complete message to the network entity via an access stratum. Said means may be or may include the at least one control processor operating an algorithm. The algorithm may include encoding a response to the RRC P2P configuration request configured as an RRC P2P configuration complete message, and transmitting the data to a base station via an access stratum.

In related aspects, the apparatus 1300 may optionally include a processor component 1310 having at least one processor, in the case of the apparatus 1300 configured as a mobile entity. The processor 1310, in such case, may be in operative communication with the components 1302-1306 via a bus 1312 or similar communication coupling. The processor 1310 may effect initiation and scheduling of the processes or functions performed by electrical components 1302-1306.

In further related aspects, the apparatus 1300 may include a radio transceiver component 1314. A stand alone receiver and/or stand alone transmitter may be used in lieu of or in conjunction with the transceiver 1314. The apparatus 1300 may optionally include a component for storing information, such as, for example, a memory device/component 1316. The computer readable medium or the memory component 1316 may be operatively coupled to the other components of the apparatus 1300 via the bus 1312 or the like. The memory component 1316 may be adapted to store computer readable instructions and data for effecting the processes and behavior of the components 1302-1306, and subcomponents thereof, or the processor 1310, or the methods disclosed herein. The memory component 1316 may retain instructions for executing functions associated with the components 1302-1306. While shown as being external to the memory 1316, it is to be understood that the components 1302-1306 can exist within the memory 1316.

Figure 14:
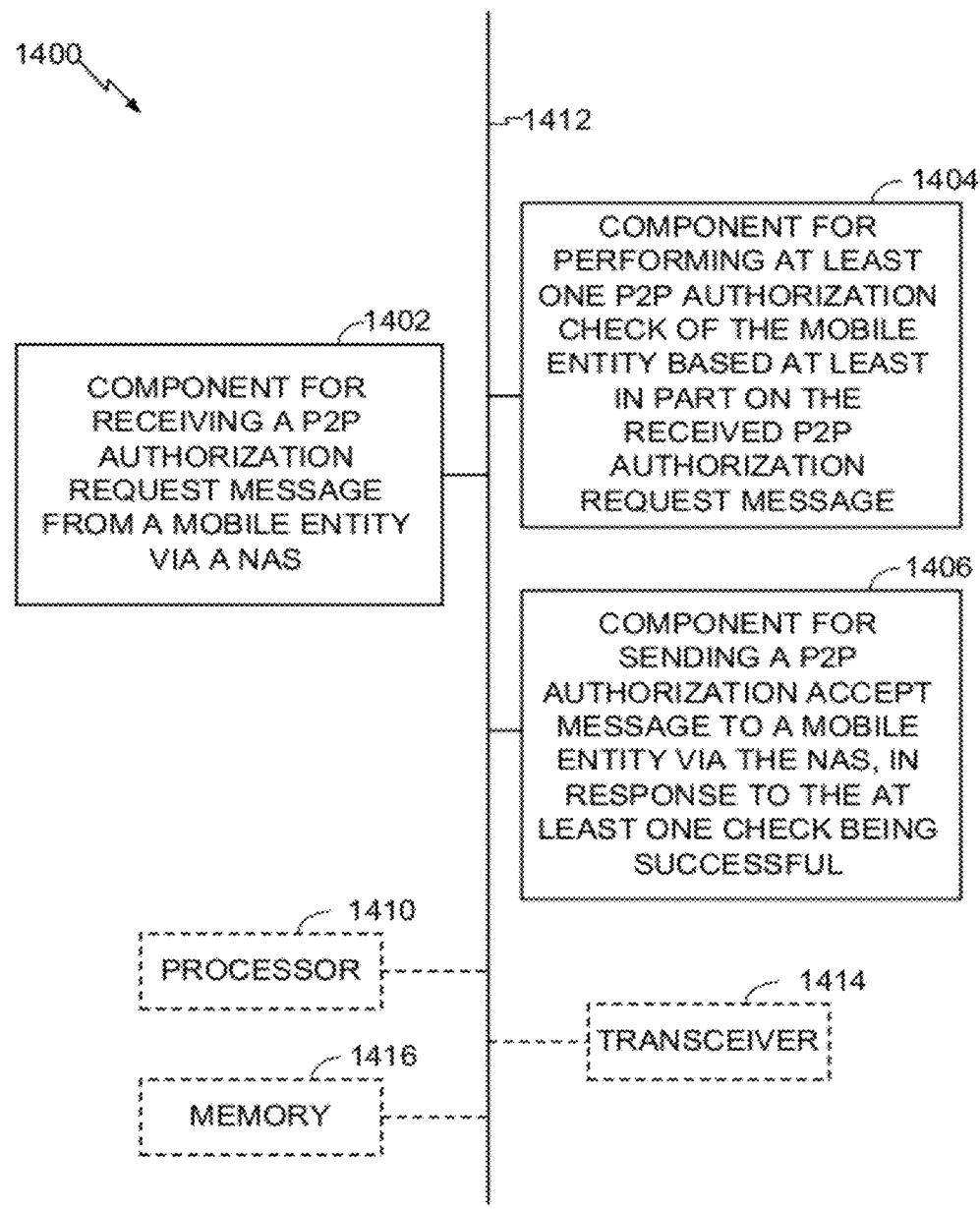
FIG. 14 illustrates an exemplary management apparatus for P2P authorization based on ESM procedures, in accordance with the methodologies of FIGS. 11-12.

In accordance with one or more aspects of the embodiments described herein, there are provided devices and apparatuses for P2P authorization based on ESM procedures, as described above with reference to FIGS. 11-12. With reference to FIG. 14, there is provided an exemplary management apparatus 1400 that may be configured as a management entity (e.g., MME) of a core network, or as a processor or similar device for use within the management entity.

As illustrated, in one embodiment, the apparatus 1400 may comprise an electrical component or module 1402 for receiving a P2P authorization request message from a mobile entity via a NAS. The component 1402 may be, or may include, a control processor coupled to a receiver and to a memory, wherein the memory holds encoded instructions for receiving a P2P authorization request message from a mobile entity via a NAS. The component 1402 may be, or may include, a means for receiving a P2P authorization request message from a mobile entity via a NAS. Said means may be or may include the at least one control processor operating an algorithm. The algorithm may include receiving data via the NAS, and recognizing an indication of a specified P2P authorization request from a mobile entity, based on the data. The algorithm may, in the alternative or in addition, include one or more of the detailed operations 1150-1162 discussed above.

The apparatus 1400 may comprise an electrical component 1404 for performing at least one P2P authorization check of the mobile entity based at least in part on the received P2P authorization request message. The component 1404 may be, or may include, a control processor coupled to a memory, wherein the memory holds encoded instructions for causing a mobile entity to perform at least one P2P authorization check of the mobile entity based at least in part on the received P2P authorization request message. The component 1404 may be, or may include, a means for performing at least one P2P authorization check of the mobile entity based at least in part on the received P2P authorization request message. Said means may be or may include the at least one control processor operating an algorithm.

The algorithm may include the more detailed operations 1140 or 1150 discussed above. In addition, or in the alternative, the algorithm may include determining a current level of available resources for a contemplated P2P operation, and determining an authorization based on the current level of available resources. The apparatus 1400 may comprise an electrical component 1406 for sending a P2P authorization accept message to a mobile entity via the NAS, in response to the at least one check being successful. The component 1406 may be, or may include, a control processor coupled to a transmitter and to a memory, wherein the memory holds encoded instructions for causing a mobile entity to send a P2P authorization accept message to a mobile entity via the NAS, in response to the at least one check being successful. The component 1306 may be, or may include, a means for sending a P2P authorization accept message to a mobile entity via the NAS, in response to the at least one check being successful. Said means may be or may include the at least one control processor operating an algorithm. The algorithm may include determining an outcome of a P2P authorization check, formatting a P2P authorization accept message based on the outcome, and transmitting the P2P authorization accept message to a mobile entity via a NAS.

In related aspects, the apparatus 1400 may optionally include a processor component 1410 having at least one processor, in the case of the apparatus 1400 configured as a management entity for a core network of a wireless communications system. The processor 1410, in such case, may be in operative communication with the components 1402-1406 via a bus 1412 or similar communication coupling. The processor 1410 may effect initiation and scheduling of the processes or functions performed by electrical components 1402-1406.

In further related aspects, the apparatus 1400 may include a radio transceiver component 1414. A stand alone receiver and/or stand alone transmitter may be used in lieu of or in conjunction with the transceiver 1414. The apparatus 1400 may optionally include a component for storing information, such as, for example, a memory device/component 1416. The computer readable medium or the memory component 1416 may be operatively coupled to the other components of the apparatus 1400 via the bus 1412 or the like. The memory component 1416 may be adapted to store computer readable instructions and data for effecting the processes and behavior of the components 1402-1406, and subcomponents thereof, or the processor 1410, or the methods disclosed herein. The memory component 1416 may retain instructions for executing functions associated with the components 1402-1406. While shown as being external to the memory 1416, it is to be understood that the components 1402-1406 can exist within the memory 1416.

Figure 15:
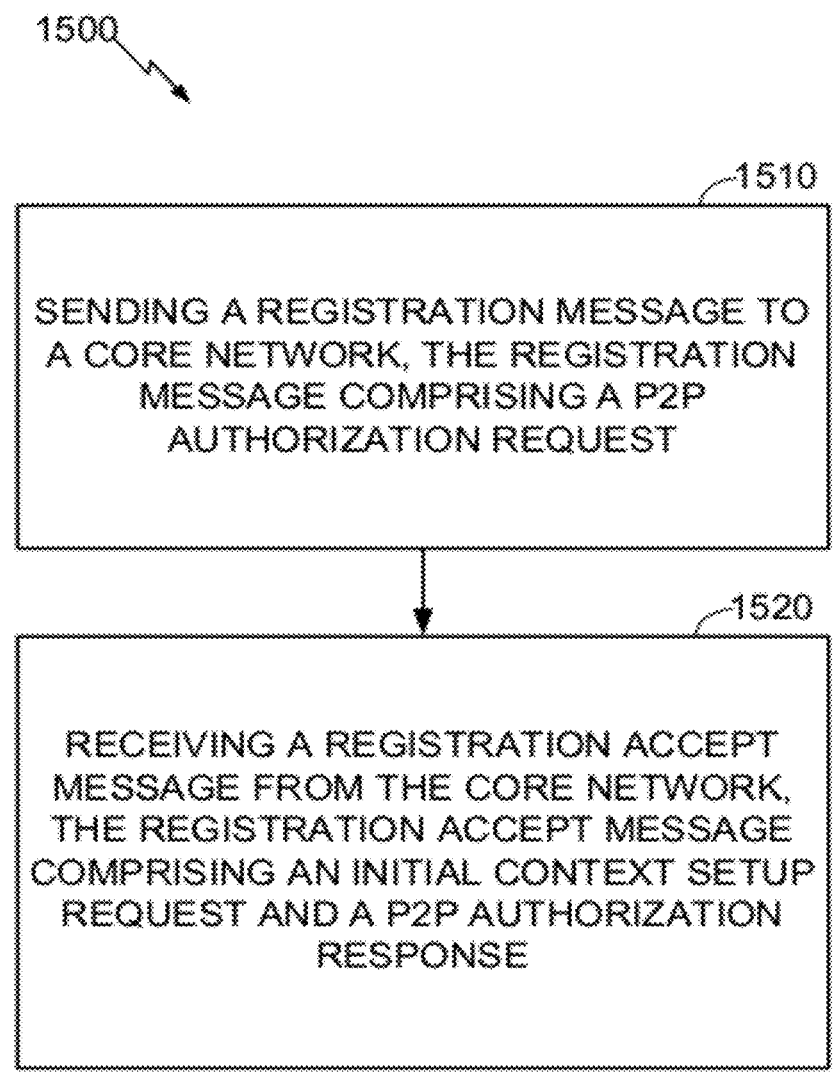
FIG. 15 illustrates an example methodology for P2P authorization based on EMM procedures, performed at a mobile entity.

In accordance with one or more aspects of the subject of this disclosure, there are provided methods for P2P authorization based on EMM procedures. With reference to FIG. 15, illustrated is a methodology 1500 that may be performed at a wireless communication apparatus, such as, for example, a mobile entity. All of the enumerated operations may be performed by the mobile entity or similar apparatus, and P2P authorization occur within the context and may have the significance as explained in connection with alternative methods set forth herein above. The method 1500 may involve, at 1510, sending a registration message to a core network, the registration message comprising a P2P authorization request. The method 1500 may involve, at 1520, receiving a registration accept message from the core network, the registration accept message comprising an initial context setup request and a P2P authorization response. In related aspects, the P2P authorization response may comprise a P2P authorization accept message, in response to a P2P authorization check of the mobile entity being successful at the core network.

Figure 16:
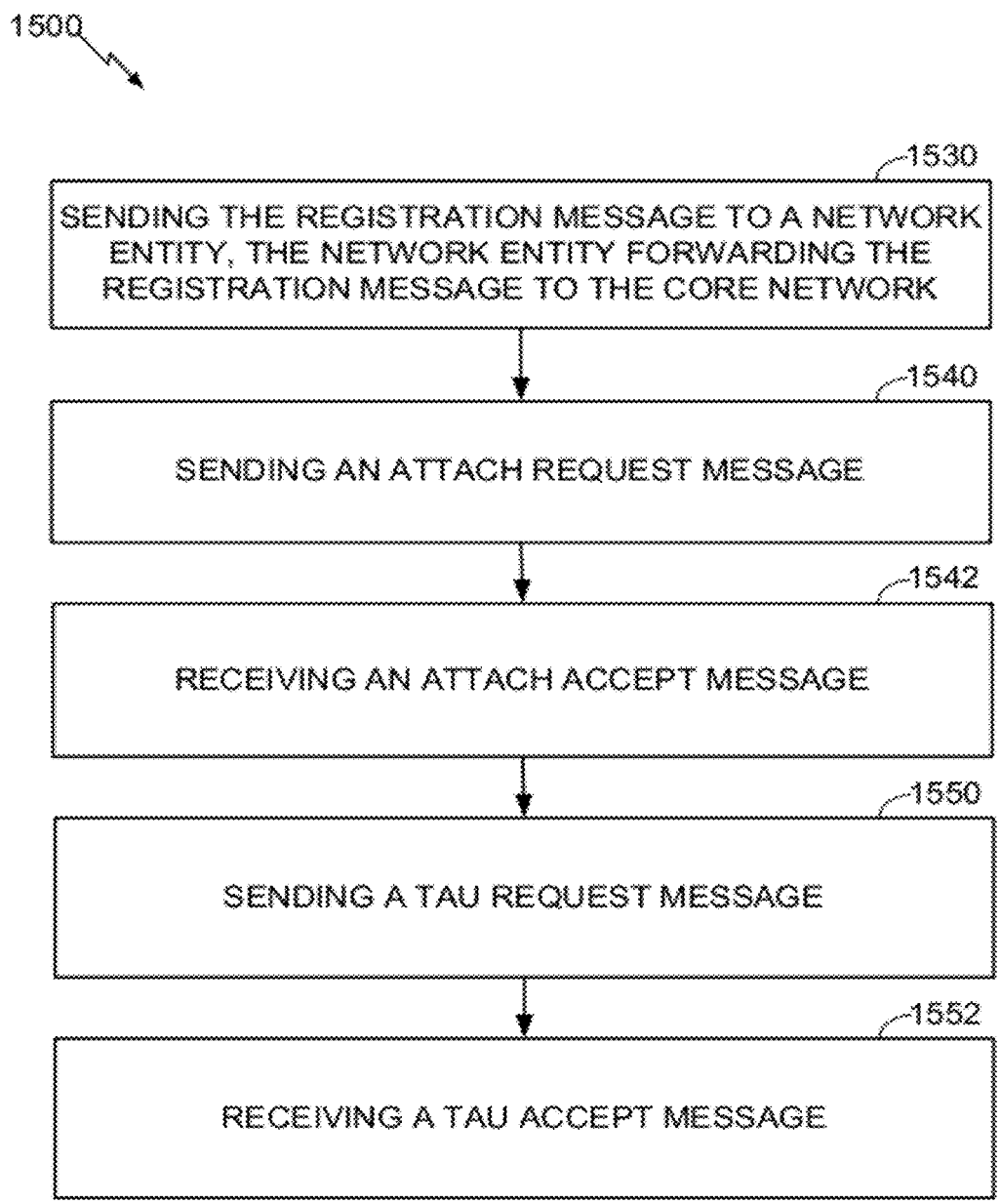
FIG. 16 shows further aspects of the methodology of FIG. 15.

FIG. 16 illustrates additional operations or aspects that may be performed in association with, or as part of, the method 1500. One or more of the additional operations shown in FIG. 16 may optionally be performed by the mobile entity as part of method 1500, or describe an aspect modifying one of the elements of the method 1500, or a more detailed algorithm for performing one of the elements of the method 1500. These elements may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1600 includes at least one of the operations 1530-1552, then the method 1500 may terminate after the at least one operation, without necessarily having to include any subsequent downstream operation(s) that may be illustrated.

With reference to FIG. 16, the sending 1510 may involve, at 1530, sending the registration message to a network entity, the network entity forwarding the registration message to the core network. In related aspects, sending the registration message 1510 may involve, at 1540, sending an attach request message. Receiving the registration accept message 1520 may involve, at 1542, receiving an attach accept message. In further related aspects, sending the registration message 1510 may involve, at 1550, sending a TAU request message. Receiving the registration accept message 1520 may involve, at 1552, receiving a TAU accept message.

Figure 17:
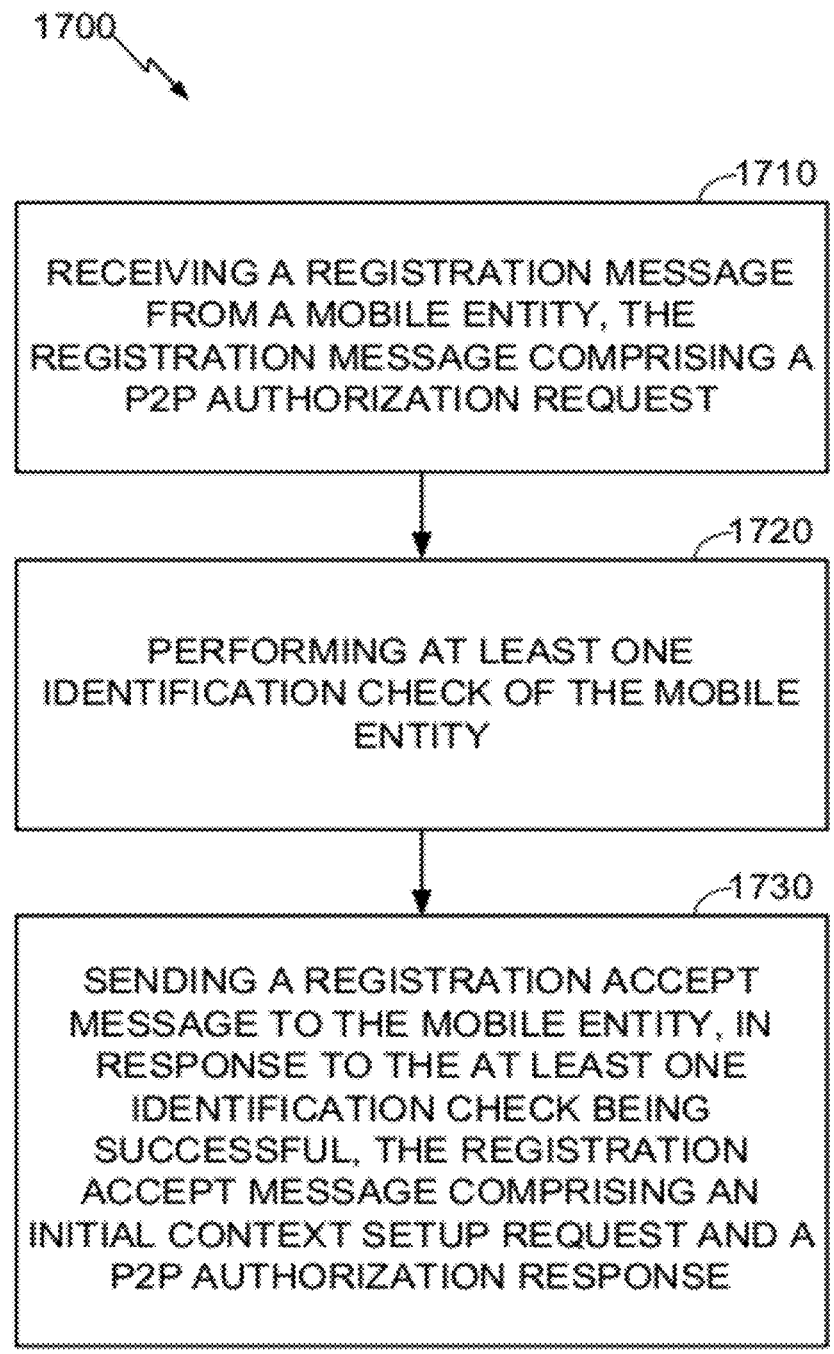
FIG. 17 illustrates an example methodology for P2P authorization based on EMM procedures, performed at a management entity.

In accordance with one or more aspects of the embodiments described herein, FIG. 17 illustrates a P2P authorization methodology 1700 based on ESM procedures, wherein the methodology 1700 may be performed at a management entity. All of the enumerated operations may be performed by the management entity or similar apparatus, and P2P authorization may occur within the context and have the significance explained above in connection with the alternative methods set forth herein. The method 1700 may involve, at 1710, receiving a registration message from a mobile entity, the registration message comprising a P2P authorization request. The method 1700 may involve, at 1720, performing at least one identification check of the mobile entity. The method 1700 may involve, at 1730, sending a registration accept message to the mobile entity, in response to the at least one identification check being successful, the registration accept message comprising an initial context setup request and a P2P authorization response. In related aspects, the P2P authorization response may comprise a P2P authorization accept message, in response to a P2P authorization check of the mobile entity being successful at the core network.

Figure 18:
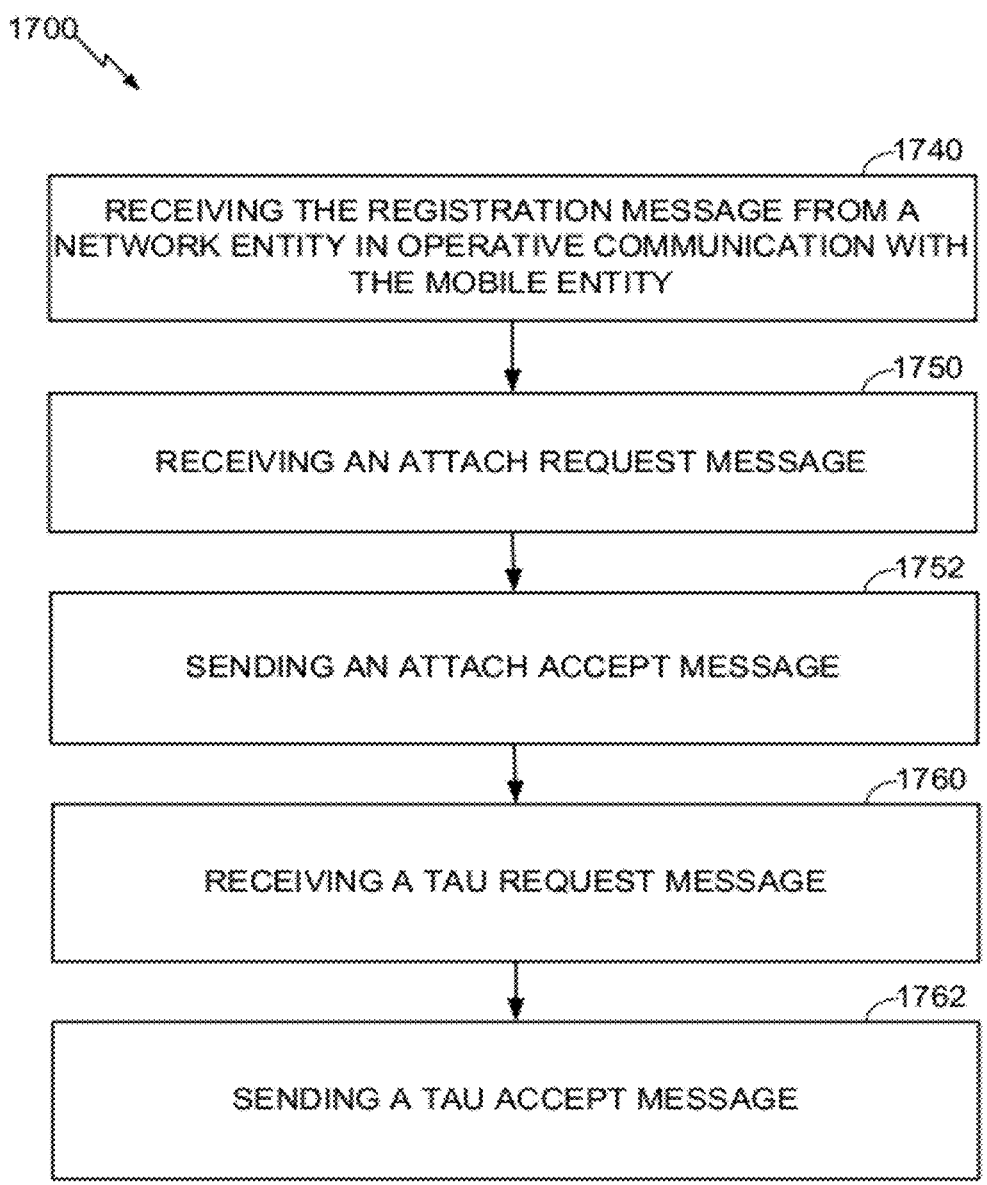
FIG. 18 shows further aspects of the methodology of FIG. 17.

FIG. 18 illustrates additional operations or aspects that may be performed in association with, or as part of, the method 1700. One or more of the additional operations shown in FIG. 18 may optionally be performed by the mobile entity as part of method 1700, or describe an aspect modifying one of the elements of the method 1700, or a more detailed algorithm for performing one of the elements of the method 1700. These elements may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1600 includes at least one of the operations 1740-1762 then the method 1500 may terminate after the at least one operation, without necessarily having to include any subsequent downstream operation(s) that may be illustrated.

With reference to FIG. 18, the receiving 1710 may involve, at 1740, receiving the registration message from a network entity in operative communication with the mobile entity. In related aspects, receiving the registration message 1710 may involve, at 1750, receiving an attach request message. In such cases, sending the registration accept message 1730 may involve, at 1752, sending an attach accept message.

In further related aspects, receiving the registration message 1710 may involve, at 1760, receiving a TAU request message. In such cases, sending the registration accept message 1730 may involve, at 1762, sending a TAU accept message.

Figure 19:
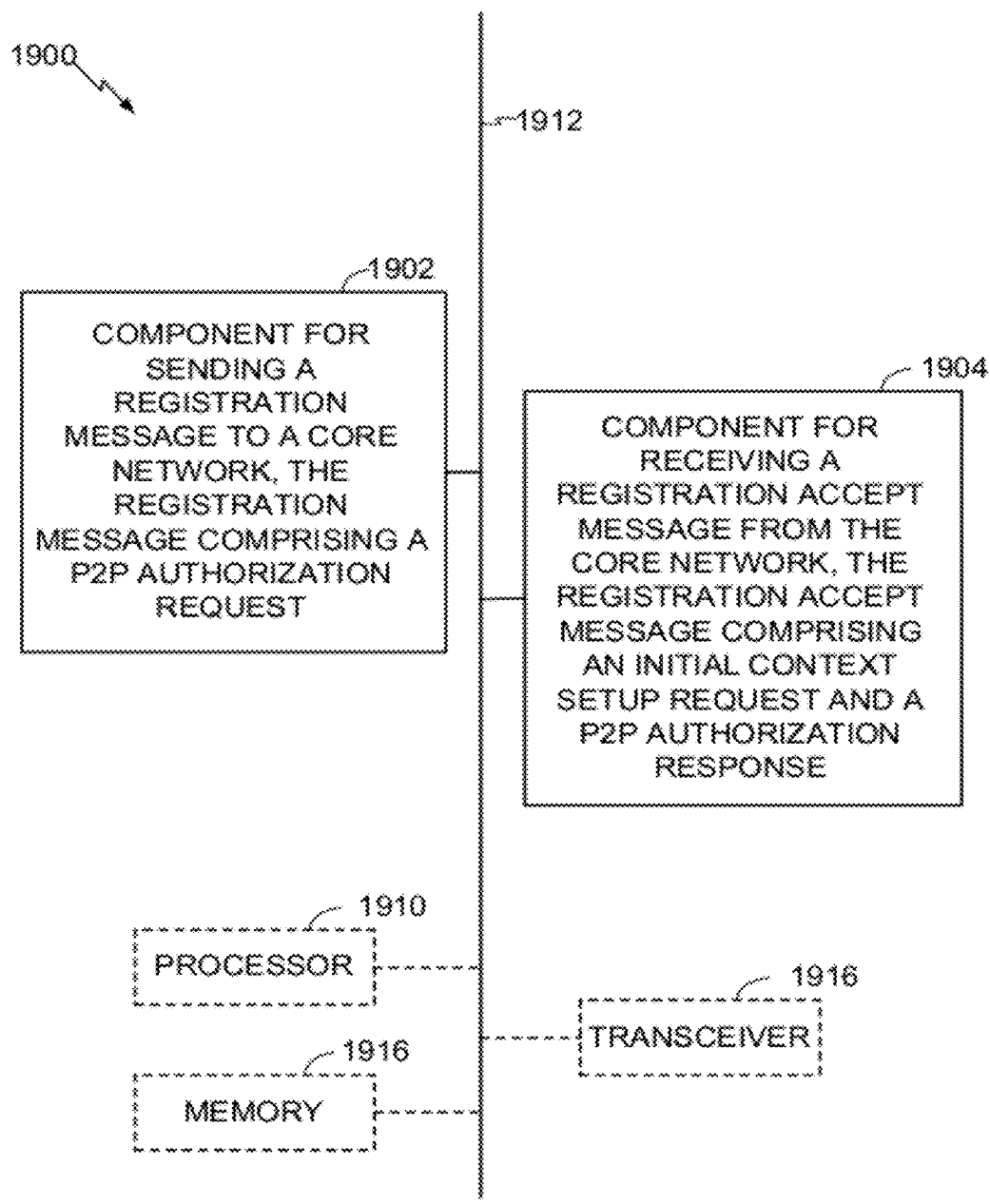
FIG. 19 illustrates an exemplary mobile apparatus for P2P authorization based on EMM procedures, in accordance with the methodologies of FIGS. 15-16.

In accordance with one or more aspects of the embodiments described herein, there are provided devices and apparatuses for P2P authorization based on EMM procedures, as described above with reference to FIGS. 15-16. With reference to FIG. 19, there is provided an exemplary mobile apparatus 1900 that may be configured as a mobile entity, or as a processor or similar device for use within the mobile entity. The apparatus 1900 may include functional blocks that can represent functions implemented by a processor, software, or combination thereof (e.g., firmware). As illustrated, in one embodiment, the apparatus 1900 may comprise an electrical component or module 1902 for sending a registration message to a core network, the registration message comprising a P2P authorization request. The component 1902 may be, or may include, a control processor coupled to a receiver and to a memory, wherein the memory holds encoded instructions for causing a mobile entity to send a registration message to a core network, the registration message comprising a P2P authorization request. The component 1902 may be, or may include, a means for sending a registration message to a core network, the registration message comprising a P2P authorization request. Said means may be or may include the at least one control processor operating an algorithm. The algorithm may include configuring a registration message as a P2P authorization request, and transmitting the registration message to a core network component. The algorithm may, in the alternative or in addition, include one or more of the detailed operations 1530, 1540 or 1550 discussed above.

The apparatus 1900 may comprise an electrical component 1904 for receiving a registration accept message from the core network, the registration accept message comprising an initial context setup request and a P2P authorization response. The component 1904 may be, or may include, a control processor coupled to a receiver and to a memory, wherein the memory holds encoded instructions for causing a mobile entity to receive a registration accept message from the core network, the registration accept message comprising an initial context setup request and a P2P authorization response. The component 1904 may be, or may include, a means for receiving a registration accept message from the core network, the registration accept message comprising an initial context setup request and a P2P authorization response. Said means may be or may include the at least one control processor operating an algorithm. The algorithm may include receiving a data signal from a core network component, and recognizing a P2P registration accept message in the data signal including at least an initial context setup request and a P2P authorization response. The algorithm may, in the alternative or in addition, include one or more of the detailed operations 1542 or 1552 discussed above.

In related aspects, the apparatus 1900 may optionally include a processor component 1910 having at least one processor, in the case of the apparatus 1900 configured as a mobile entity. The processor 1910, in such case, may be in operative communication with the components 1902-1904 via a bus 1912 or similar communication coupling. The processor 1910 may effect initiation and scheduling of the processes or functions performed by electrical components 1902-1904.

In further related aspects, the apparatus 1900 may include a radio transceiver component 1914. A stand alone receiver and/or stand alone transmitter may be used in lieu of or in conjunction with the transceiver 1914. The apparatus 1900 may optionally include a component for storing information, such as, for example, a memory device/component 1916. The computer readable medium or the memory component 1916 may be operatively coupled to the other components of the apparatus 1900 via the bus 1912 or the like. The memory component 1916 may be adapted to store computer readable instructions and data for effecting the processes and behavior of the components 1902-1904, and subcomponents thereof, or the processor 1910, or the methods disclosed herein. The memory component 1916 may retain instructions for executing functions associated with the components 1902-1904. While shown as being external to the memory 1916, it is to be understood that the components 1902-1904 can exist within the memory 1916.

Figure 20:
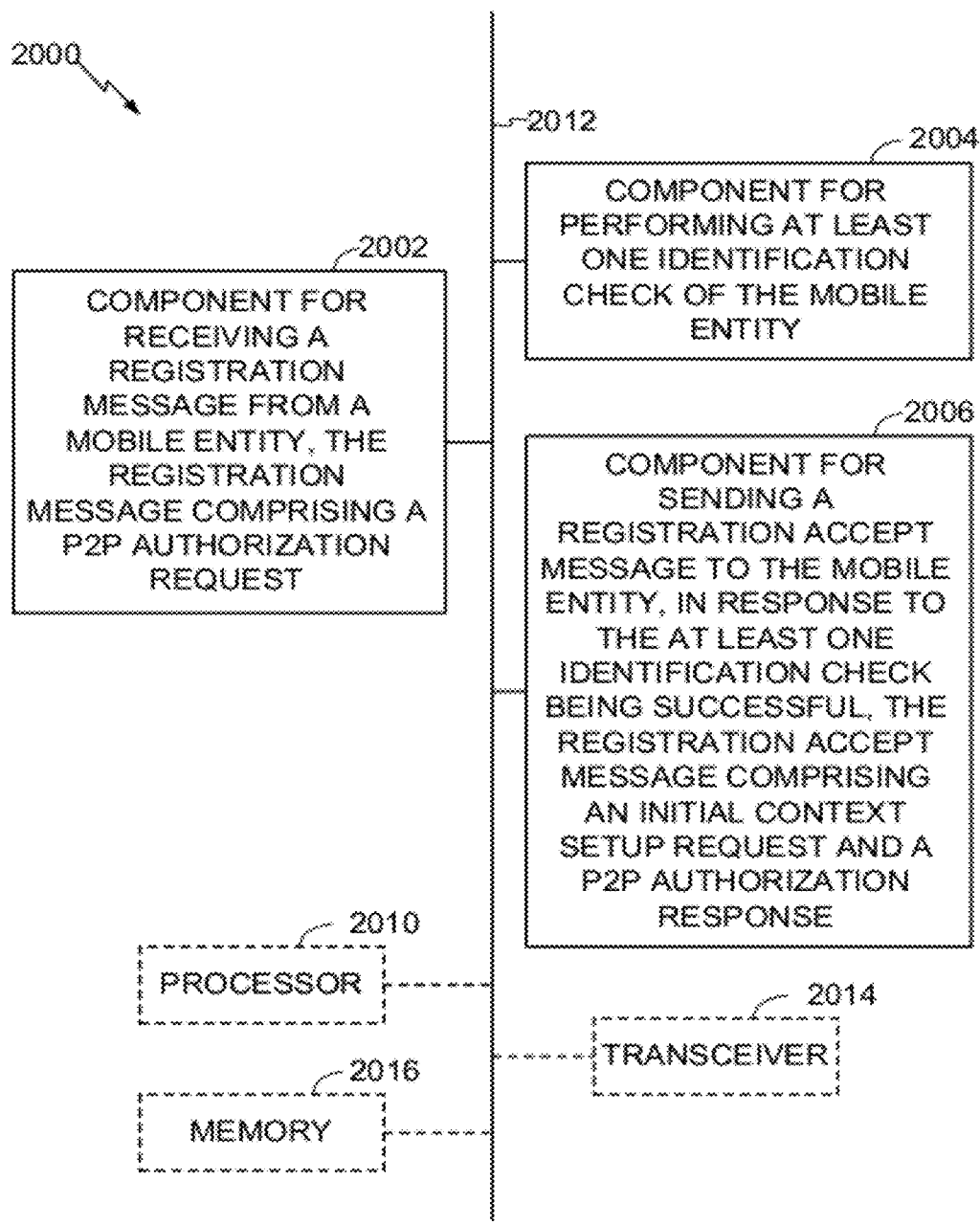
FIG. 20 illustrates an exemplary management apparatus for P2P authorization based on EMM procedures, in accordance with the methodologies of FIGS. 17-18.

In accordance with one or more aspects of the embodiments described herein, there are provided devices and apparatuses for P2P authorization based on EMM procedures, as described above with reference to FIGS. 17-18. With reference to FIG. 20, there is provided an exemplary management apparatus 2000 that may be configured as a management entity, or as a processor or similar device for use within the management entity.

In one embodiment, the apparatus 2000 may comprise an electrical component or module 2002 for receiving a registration message from a mobile entity, the registration message comprising a P2P authorization request. The component 2002 may be, or may include, a control processor coupled to a receiver and to a memory, wherein the memory holds encoded instructions for causing a management entity to receive a registration message from a mobile entity, the registration message comprising a P2P authorization request. The component 2002 may be, or may include, a means for receiving a registration message from a mobile entity, the registration message comprising a P2P authorization request. Said means may be or may include the at least one control processor operating an algorithm. The algorithm may include receiving a data signal from a mobile entity, and recognizing a P2P authorization request message in the data signal. The algorithm may, in the alternative or in addition, include one or more of the detailed operations 1740, 1750 or 1760 discussed above.

The apparatus 2000 may comprise an electrical component 2004 for performing at least one identification check of the mobile entity. The component 2004 may be, or may include, a control processor coupled to a receiver and to a memory, wherein the memory holds encoded instructions for causing a management entity to perform at least one identification check of the mobile entity. The component 2004 may be, or may include, a means for performing at least one identification check of the mobile entity. Said means may be or may include the at least one control processor operating an algorithm. The algorithm may include receiving a data signal from a mobile entity, recognizing an identifier for the mobile entity in the data signal, performing a data lookup to retrieve current authorization data based on the identifier, and returned a identification result based on the data lookup.

The apparatus 2000 may comprise an electrical component 2006 for sending a registration accept message to the mobile entity, in response to the at least one identification check being successful, the registration accept message comprising an initial context setup request and a P2P authorization response. The component 2006 may be, or may include, a control processor coupled to a receiver and to a memory, wherein the memory holds encoded instructions for causing a management entity to send a registration accept message to the mobile entity, in response to the at least one identification check being successful, the registration accept message comprising an initial context setup request and a P2P authorization response. The component 2006 may be, or may include, a means for sending a P2P registration accept message to the mobile entity, in response to the at least one identification check being successful, the registration accept message comprising an initial context setup request and a P2P authorization response. Said means may be or may include the at least one control processor operating an algorithm. The algorithm may include configuring a data signal to indicate a P2P registration accept message including at least an initial context setup request and an authorization to perform one or more P2P operations. The algorithm may, in the alternative or in addition, include one or more of the detailed operations 1752 or 1762 discussed above.

In related aspects, the apparatus 2000 may optionally include a processor component 2010 having at least one processor, in the case of the apparatus 2000 configured as a management entity for a core network of a wireless communications system. The processor 2010, in such case, may be in operative communication with the components 2002-2006 via a bus 2012 or similar communication coupling. The processor 2010 may effect initiation and scheduling of the processes or functions performed by electrical components 2002-2006.

In further related aspects, the apparatus 2000 may include a radio transceiver component 2020. A stand alone receiver and/or stand alone transmitter may be used in lieu of or in conjunction with the transceiver 2020. The apparatus 2000 may optionally include a component for storing information, such as, for example, a memory device/component 2016. The computer readable medium or the memory component 2016 may be operatively coupled to the other components of the apparatus 2000 via the bus 2012 or the like. The memory component 2016 may be adapted to store computer readable instructions and data for effecting the processes and behavior of the components 2002-2006, and subcomponents thereof, or the processor 2010, or the methods disclosed herein. The memory component 2016 may retain instructions for executing functions associated with the components 2002-2006. While shown as being external to the memory 2016, it is to be understood that the components 2002-2006 can exist within the memory 2016.

It should be understood that the specific order or hierarchy of steps in the processes disclosed are merely examples of approaches for P2P authorization within a cellular wireless communication system. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Non-transitory computer-readable media may include computer storage media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes Compact Disc (CD), laser disc, optical disc, Digital Versatile Disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for peer-to-peer (P2P) authorization by a mobile entity, comprising:
   receiving a P2P authorization accept message from a management entity via a non-access stratum (NAS),
      the P2P authorization accept message comprising an authorization for discovery,
      the authorization for discovery indicating that the mobile entity is authorized to discover a peer mobile entity for P2P communication, and
      receiving the P2P authorization accept message comprising receiving an activate default Evolved Packet System (EPS) bearer context message;
   receiving a radio resource control (RRC) P2P configuration request from a network entity; and
   sending an RRC P2P configuration complete message to the network entity via an access stratum.

2. The method of claim 1, further comprising sending a P2P authorization request message to the management entity via the NAS.

3. The method of claim 1, further comprising transmitting a P2P authorization complete message to the management entity via the NAS.

4. The method of claim 1, further comprising transmitting an activate default EPS bearer context accept message to the management entity via the NAS.

5. The method of claim 1, wherein the P2P authorization accept message further comprises an authorization for direct communication between the mobile entity and the peer mobile entity.

6. The method of claim 1, wherein receiving the P2P authorization accept message further comprises receiving an activate dedicated EPS bearer context message.

7. The method of claim 6, further comprising transmitting an activate dedicated EPS bearer context accept message to the management entity via the NAS.

8. The method of claim 1, wherein:
   the mobile entity comprises a user equipment (UE);
   the management entity comprises a mobile management entity (MME); and
   the network entity comprises an evolved NodeB (eNB).

9. An apparatus, comprising:
   at least one processor configured to:
      receive a peer-to-peer (P2P) authorization accept message from a management entity via anon-access stratum (NAS), the P2P authorization accept message comprising an authorization for discovery,
the authorization for discovery indicating that the apparatus is authorized to discover a peer apparatus for P2P communication, and
the P2P authorization accept message further comprising an authorization for direct communication between the apparatus and the peer apparatus;
receive a radio resource control (RRC) P2P configuration request from a network entity; and
send an RRC P2P configuration complete message to the network entity via an access stratum; and
a memory coupled to the at least one processor for storing data.

10. The apparatus of claim 9, wherein the at least one processor is configured to send a P2P authorization request message to the management entity via the NAS.

11. The apparatus of claim 9, wherein the at least one processor is configured to transmit a P2P authorization complete message to the management entity via the NAS.

12. The apparatus of claim 9, wherein the at least one processor is configured to receive the P2P authorization accept message by receiving an activate default Evolved Packet System (EPS) bearer context message.

13. The apparatus of claim 12, wherein the at least one processor is configured to transmit an activate default EPS bearer context accept message to the management entity via the NAS.

14. The apparatus of claim 9, wherein the at least one processor is configured to receive the P2P authorization accept message by receiving an activate dedicated EPS bearer context message.

15. The apparatus of claim 14, wherein the at least one processor is configured to transmit an activate dedicated EPS bearer context accept message to the management entity via the NAS.

16. An apparatus, comprising:
means for receiving a peer-to-peer (P2P) authorization accept message from a management entity via a non-access stratum (NAS),
the P2P authorization accept message comprising an authorization for discovery,
the authorization for discovery indicating that the apparatus is authorized to discover a peer apparatus for P2P communication, and
the P2P authorization accept message further comprising an authorization for direct communication between the apparatus and the peer apparatus;
means for receiving a radio resource control (RRC) P2P configuration request from a network entity; and
means for sending an RRC P2P configuration complete message to the network entity via an access stratum.

17. A non-transitory computer-readable medium storing instructions, the instructions comprising:
one or more instructions that, when executed by a mobile entity, cause the mobile entity to:
receive a peer-to-peer (P2P) authorization accept message from a management entity via a non-access stratum (NAS),
the P2P authorization message comprising an authorization for discovery,
the authorization for discovery indicating that the mobile entity is authorized to discover a peer mobile entity for P2P communication, and
the P2P authorization accept message further comprising an authorization for direct communication between the mobile entity and the peer mobile entity;
receive a radio resource control (RRC) P2P configuration request from a network entity; and
send an RRC P2P configuration complete message to the network entity via an access stratum.

18. A method for peer-to-peer (P2P) authorization by a management entity, comprising:
receiving a P2P authorization request message from a mobile entity via a non-access stratum (NAS),
the P2P authorization message comprising an authorization for discovery,
the authorization for discovery indicating that the mobile entity is authorized to discover a peer mobile entity for P2P communication, and
receiving the P2P authorization request message comprising receiving a Packet Data Network (PDN) connectivity request message;
performing at least one P2P authorization check of the mobile entity based at least in part on the received P2P authorization request message; and
in response to the at least one check being successful, sending a P2P authorization accept message to the mobile entity via the NAS.

19. The method of claim 18, wherein performing the at least one check comprises determining whether a specific ID or specific prefix associated with the mobile entity matches a subscription of the mobile entity.

20. The method of claim 18, wherein performing the at least one check comprises determining whether a specific ID or specific prefix associated with the mobile entity is unexpired.

21. The method of claim 18, wherein sending the P2P authorization accept message comprises sending an activate default Evolved Packet System (EPS) bearer context message.

22. The method of claim 21, further comprising receiving an activate default EPS bearer context accept message from the mobile entity via the NAS.

23. The method of claim 18, wherein the P2P authorization accept message comprises an authorization for direct communication.

24. The method of claim 23, further comprising receiving an activate dedicated EPS bearer context accept message from the mobile entity via the NAS.

25. The method of claim 18, wherein:
receiving the P2P authorization request message further comprises receiving a bearer resource allocation request message; and
sending the P2P authorization accept message comprises sending an activate dedicated EPS bearer context message.

26. The method of claim 18, wherein:
the mobile entity comprises a user equipment (UE); and
the management entity comprises a mobile management entity (MME).

27. An apparatus, comprising:
at least one processor configured to:
receive a peer-to-peer (P2P) authorization request message from a mobile entity via a non-access stratum (NAS), the P2P authorization message comprising an authorization for discovery,
the authorization for discovery indicating that the mobile entity is authorized to discover a peer mobile entity for P2P communication, and the at least one processor being configured to receive the P2P authorization request message by receiving a bearer resource allocation request message;
perform at least one P2P authorization check of the mobile entity based at least in part on the received P2P authorization request message; and
send a P2P authorization accept message to the mobile entity via the NAS, in response to the at least one check being successful; and
a memory coupled to the at least one processor for storing data.

28. The apparatus of claim 27, wherein the at least one processor is configured to perform the at least one check by determining whether a specific ID or specific prefix associated with the mobile entity matches a subscription of the mobile entity.

29. The apparatus of claim 27, wherein the at least one processor is configured to perform the at least one check by determining whether a specific ID or specific prefix associated with the mobile entity is unexpired.

30. The apparatus of claim 27, wherein:
wherein the at least one processor is configured to receive the P2P authorization request message further by receiving a Packet Data Network (PDN) connectivity request message; and
wherein the at least one processor is configured to send the P2P authorization accept message by sending an activate default Evolved Packet System (EPS) bearer context message.

31. The apparatus of claim 27, wherein the at least one processor is configured to receive an activate default EPS bearer context accept message from the mobile entity via the NAS.

32. The apparatus of claim 27, wherein the P2P authorization accept message comprises an authorization for direct communication.

33. The apparatus of claim 27, wherein the at least one processor is configured to send the P2P authorization accept message by sending an activate dedicated EPS bearer context message.

34. The apparatus of claim 33, wherein the at least one processor is configured to receive an activate dedicated EPS bearer context accept message from the mobile entity via the NAS.

35. An apparatus, comprising:
means for receiving a peer-to-peer (P2P) authorization request message from a mobile entity via a non-access stratum (NAS),
the P2P authorization message comprising an authorization for discovery, and
the authorization for discovery indicating that the mobile entity is authorized to discover a peer mobile entity for P2P communication;
means for performing at least one P2P authorization check of the mobile entity based at least in part on the received P2P authorization request message; and
means for sending a P2P authorization accept message to the mobile entity via the NAS, in response to the at least one check being successful,
the means for sending the P2P authorization accept message comprising means for sending an activate default Evolved Packet System (EPS) bearer context message.

36. A non-transitory computer-readable medium storing instructions, the instructions comprising:
one or more instructions that, when executed by a computer, cause the computer to:
receive a peer-to-peer (P2P) authorization request message from a mobile entity via a non-access stratum (NAS), the P2P authorization message comprising an authorization for discovery,
the authorization for discovery indicating that the mobile entity is authorized to discover a peer mobile entity for P2P communication;
perform at least one P2P authorization check of the mobile entity based at least in part on the received P2P authorization request message; and
send a P2P authorization accept message to the mobile entity via the NAS, in response to the at least one check being successful,
the one or more instructions to send the P2P authorization accept message comprise one or more instructions to send an activate dedicated EPS bearer context message.

37. A method for peer-to-peer (P2P) authorization by a mobile entity, comprising:
sending a registration message to a core network,
the registration message comprising a P2P authorization request, and
sending the registration message comprising sending an attach request message; and
receiving a registration accept message from the core network,
the registration accept message comprising an initial context setup request and a P2P authorization response,
the P2P authorization response comprising an authorization for discovery, and
the authorization for discovery indicating that the mobile entity is authorized to discover a peer mobile entity for P2P communication.

38. The method of claim 37, wherein sending the registration message comprises sending the registration message to a network entity, the network entity forwarding the registration message to the core network.

39. The method of claim 38, wherein the network entity comprises an evolved NodeB (eNB).

40. The method of claim 37, wherein the P2P authorization response comprises a P2P authorization accept message, in response to a P2P authorization check of the mobile entity being successful at the core network.

41. The method of claim 37, wherein receiving the registration accept message comprises receiving an attach accept message.

42. The method of claim 37, wherein:
sending the registration message further comprises sending a tracking area update (TAU) request message; and
receiving the registration accept message comprises receiving a TAU accept message.

43. The method of claim 37, wherein:
the P2P authorization comprises a general P2P authorization;
the mobile entity comprises a user equipment (UE); and
sending the registration message comprises sending the registration message to a mobile management entity (MME) of the core network.

44. An apparatus, comprising:
at least one processor configured to:
send a registration message to a core network,
the registration message comprising a peer-to-peer (P2P) authorization request; and
receive a registration accept message from the core network,
the registration accept message comprising an initial context setup request and a P2P authorization response,
the P2P authorization response comprising an authorization for discovery, the authorization for discovery indicating that the apparatus is authorized to discover a peer apparatus for P2P communication, and the at least one processor being configured to receive the registration accept message by receiving an attach accept message; and a memory coupled to the at least one processor for storing data.

45. The apparatus of claim 44, wherein the at least one processor is configured to send the registration message to a network entity, the network entity forwarding the registration message to the core network.

46. The apparatus of claim 44, wherein the P2P authorization response comprises a P2P authorization accept message, in response to a P2P authorization check being successful at the core network.

47. The apparatus of claim 44, wherein the at least one processor is configured to send the registration message by sending an attach request message.

48. The apparatus of claim 44, wherein:
the at least one processor is configured to send the registration message by sending a tracking area update (TAU) request message; and
the at least one processor is configured to receive the registration accept message further by receiving a TAU accept message.

49. An apparatus, comprising:
means for sending a registration message to a core network,
the registration message comprising a peer-to-peer (P2P) authorization request, and
the means for sending the registration message comprise means for sending a tracking area update (TAU) request message; and
means for receiving a registration accept message from the core network,
the registration accept message comprising an initial context setup request and a P2P authorization response,
the P2P authorization response comprising an authorization for discovery, and
the authorization for discovery indicating that the apparatus is authorized to discover a peer apparatus for P2P communication.

50. A non-transitory computer-readable medium storing instructions, the instructions comprising:
one or more instructions that, when executed by a mobile entity, cause the mobile entity to:
send a registration message to a core network,
the registration message comprising a peer-to-peer (P2P) authorization request; and
receive a registration accept message from the core network,
the registration accept message comprising an initial context setup request and a P2P authorization response,
the P2P authorization response comprising an authorization for discovery,
the authorization for discovery indicating that the mobile entity is authorized to discover a peer mobile entity for P2P communication, and
the one or more instructions to receive the registration accept message comprise one or more instructions to receive a tracking area update (TAU) accept message.

51. A method for peer-to-peer (P2P) authorization by a management entity of a core network, comprising:
receiving a registration message from a mobile entity, the registration message comprising a P2P authorization request,
receiving the registration message comprising receiving an attach request message;
performing at least one identification check of the mobile entity; and
in response to the at least one identification check being successful, sending a registration accept message to the mobile entity,
the registration accept message comprising an initial context setup request and a P2P authorization response,
the P2P authorization response comprising an authorization for discovery, and
the authorization for discovery indicating that the mobile entity is authorized to discover a peer mobile entity for P2P communication.

52. The method of claim 51, wherein receiving the registration message comprises receiving the registration message from a network entity in operative communication with the mobile entity.

53. The method of claim 52, wherein the network entity comprises an evolved NodeB (eNB).

54. The method of claim 51, wherein the P2P authorization response comprises a P2P authorization accept message, in response to a P2P authorization check of the mobile entity being successful at the core network.

55. The method of claim 51, wherein:
sending the registration accept message comprises sending an attach accept message.

56. The method of claim 51, wherein:
receiving the registration message further comprises receiving a tracking area update (TAU) request message; and
sending the registration accept message comprises sending a TAU accept message.

57. The method of claim 51, wherein:
the P2P authorization comprises a general P2P authorization;
the management entity comprises a mobile management entity (MME); and
receiving the registration message comprises receiving the registration message from a user equipment (UE).

58. An apparatus, comprising:
at least one processor configured to:
receive a registration message from a mobile entity, the registration message comprising a peer-to-peer (P2P) authorization request,
the at least one processor being configured to receive the registration message by receiving a tracking area update (TAU) request message;
perform at least one identification check of the mobile entity; and
send a registration accept message to the mobile entity, in response to the at least one identification check being successful, the registration accept message comprising an initial context setup request and a P2P authorization response, wherein the P2P authorization response comprises an authorization for discovery,
the authorization for discovery indicating that the mobile entity is authorized to discover a peer mobile entity for P2P communication; and
a memory coupled to the at least one processor for storing data.

59. The apparatus of claim 58, wherein the at least one processor is configured to receive the registration message from a network entity in operative communication with the mobile entity.

60. The apparatus of claim 58, wherein the P2P authorization response comprises a P2P authorization accept message, in response to a P2P authorization check of the mobile entity being successful.

61. The apparatus of claim 58, wherein the at least one processor is configured to:
receive the registration message further by receiving an attach request message; and
send the registration accept message by sending an attach accept message.

62. The apparatus of claim 58, wherein the at least one processor is configured to send the registration accept message by sending a TAU accept message.

63. An apparatus, comprising:
means for receiving a registration message from a mobile entity, the registration message comprising a peer-to-peer (P2P) authorization request;
means for performing at least one identification check of the mobile entity; and
means for sending a registration accept message to the mobile entity, in response to the at least one identification check being successful,
the registration accept message comprising an initial context setup request and a P2P authorization response,
the P2P authorization response comprising an authorization for discovery,
the authorization for discovery indicating that the mobile entity is authorized to discover a peer mobile entity for P2P communication, and
the means for sending the registration accept message comprises means for sending an attach accept message.

64. A non-transitory computer-readable medium storing instructions, the instructions comprising:
one or more instructions that, when executed by a computer, cause the computer to:
receive a registration message from a mobile entity, the registration message comprising a peer-to-peer (P2P) authorization request;
perform at least one identification check of the mobile entity; and
send a registration accept message to the mobile entity, in response to the at least one identification check being successful,
the registration accept message comprising an initial context setup request and a P2P authorization response,
the P2P authorization response comprising an authorization for discovery,
the authorization for discovery indicating that the mobile entity is authorized to discover a peer mobile entity for P2P communication, and
the P2P authorization response further comprising a P2P authorization accept message, in response to a P2P authorization check of the mobile entity being successful.

65. The non-transitory computer-readable medium of claim 64, wherein the one or more instructions to receive the registration message comprise one or more instructions to receive an attach request message.

66. The non-transitory computer-readable medium of claim 64, wherein the one or more instructions to send the registration accept message comprise one or more instructions to send a tracking area update (TAU) accept message.

\* \* \* \* \*